United States Patent
Suzuki et al.

(10) Patent No.: US 12,018,137 B2
(45) Date of Patent: Jun. 25, 2024

(54) GAS BARRIER COATING MATERIAL, GAS BARRIER FILM, GAS BARRIER LAMINATE, AND METHOD FOR PRODUCING GAS BARRIER LAMINATE

(71) Applicant: MITSUI CHEMICALS TOHCELLO, INC., Tokyo (JP)

(72) Inventors: Shingo Suzuki, Koga (JP); Takaaki Iio, Koga (JP); Tadahito Nobori, Tokyo (JP)

(73) Assignee: MITSUI CHEMICALS TOHCELLO, INC., Tokyo (JP)

( * ) Notice: Subject to any disclaimer, the term of this patent is extended or adjusted under 35 U.S.C. 154(b) by 0 days.

(21) Appl. No.: 17/789,000

(22) PCT Filed: Dec. 21, 2020

(86) PCT No.: PCT/JP2020/047617
§ 371 (c)(1),
(2) Date: Jun. 24, 2022

(87) PCT Pub. No.: WO2021/132127
PCT Pub. Date: Jul. 1, 2021

(65) Prior Publication Data
US 2023/0036471 A1    Feb. 2, 2023

(30) Foreign Application Priority Data

Dec. 27, 2019 (JP) .................. 2019-238465
Dec. 27, 2019 (JP) .................. 2019-238508
Dec. 27, 2019 (JP) .................. 2019-238626

(51) Int. Cl.
*B32B 27/34*    (2006.01)
*B05D 3/02*    (2006.01)
(Continued)

(52) U.S. Cl.
CPC ............ *C08J 7/048* (2020.01); *B05D 3/0209* (2013.01); *B05D 3/0254* (2013.01);
(Continued)

(58) Field of Classification Search
CPC ........ C08J 7/048; C08J 7/0423; C08J 7/0427; C08J 2333/02; C08J 2333/08;
(Continued)

(56) References Cited

U.S. PATENT DOCUMENTS 7,476,712 B2    1/2009    Tanaka et al.
9,162,431 B2    10/2015    Matsumoto et al.
(Continued)

FOREIGN PATENT DOCUMENTS

JP    2003171468 A    6/2003
JP    2004-051146 A    2/2004
(Continued)

OTHER PUBLICATIONS

International Search Report (PCT/ISA/210) with an English translation, and Written Opinion (PCT/ISA/237) dated Mar. 23, 2021, by the Japan Patent Office as the International Searching Authority for International Application No. PCT/JP2020/047617. (13 pages).

(Continued)

*Primary Examiner* — John D Freeman
(74) *Attorney, Agent, or Firm* — BUCHANAN, INGERSOLL & ROONEY PC

(57) ABSTRACT

A gas barrier film formed of a cured product of a mixture including a polycarboxylic acid, a polyamine compound, and a polyvalent metal compound, in which in an infrared absorption spectrum of the gas barrier film, an area ratio of an amide bond represented by B/A is equal to or less than 0.380, an area ratio of a carboxylic acid represented by C/A is equal to or less than 0.150, and an area ratio of carboxylate represented by D/A is equal to or more than 0.520.

16 Claims, 1 Drawing Sheet

(51) Int. Cl.
| | |
|---|---|
| B05D 3/04 | (2006.01) |
| B05D 7/00 | (2006.01) |
| B05D 7/24 | (2006.01) |
| B32B 27/36 | (2006.01) |
| B65D 65/42 | (2006.01) |
| C08G 69/26 | (2006.01) |
| C08J 7/048 | (2020.01) |
| C08L 33/02 | (2006.01) |
| C09D 7/61 | (2018.01) |
| C09D 177/06 | (2006.01) |
| C08K 3/22 | (2006.01) |

(52) U.S. Cl.
CPC .............. *B05D 3/0413* (2013.01); *B05D 7/24* (2013.01); *B05D 7/54* (2013.01); *B32B 27/34* (2013.01); *B32B 27/36* (2013.01); *B65D 65/42* (2013.01); *C08G 69/26* (2013.01); *C08L 33/02* (2013.01); *C09D 7/61* (2018.01); *C09D 177/06* (2013.01); *B32B 2250/02* (2013.01); *B32B 2250/24* (2013.01); *B32B 2255/10* (2013.01); *B32B 2255/20* (2013.01); *B32B 2255/26* (2013.01); *B32B 2255/28* (2013.01); *B32B 2307/518* (2013.01); *B32B 2307/7244* (2013.01); *B32B 2307/7246* (2013.01); *B32B 2439/70* (2013.01); *C08K 2003/2296* (2013.01)

(58) Field of Classification Search
CPC .............. C08J 2333/10; C08J 2333/12; C08J 2367/02; C08J 2379/02; C08J 2433/02; C08J 2479/02; B05D 3/0209; B05D 3/0254; B05D 3/0413; B05D 7/24; B05D 7/54; B05D 7/04; B05D 2350/60; B05D 3/067; B05D 2252/02; B32B 27/34; B32B 27/36; B32B 2250/02; B32B 2255/10; B32B 2255/20; B32B 2255/26; B32B 2255/28; B32B 2307/7244; B32B 2307/7246; B32B 2439/70; B32B 27/08; B32B 27/16; B32B 27/32; B32B 2250/24; B32B 2307/518; B32B 2307/748; B32B 7/023; B32B 9/00; B32B 2307/7242; B32B 2367/00; B32B 2377/00; B65D 65/42; C09D 7/61; C09D 177/06; C09D 177/00; C09D 179/02; C09D 177/02; C08K 2003/2296; C08K 3/22; C08L 79/02; C08L 33/02; C08G 69/26; C08G 69/30

See application file for complete search history.

(56) References Cited

U.S. PATENT DOCUMENTS

| | | | |
|---|---|---|---|
| 9,327,475 | B2 | 5/2016 | Hirose et al. |
| 10,683,432 | B2 | 6/2020 | Okuyama et al. |
| 10,995,224 | B2 | 5/2021 | Kidokoro et al. |
| 2005/0131162 | A1 | 6/2005 | Tanaka et al. |
| 2011/0027581 | A1 | 2/2011 | Hirose et al. |
| 2013/0130062 | A1 | 5/2013 | Matsumoto et al. |
| 2017/0057209 | A1* | 3/2017 | Omori .................. B32B 27/308 |
| 2017/0210909 | A1 | 7/2017 | Kidokoro et al. |
| 2017/0210932 | A1 | 7/2017 | Okuyama et al. |
| 2019/0040275 | A1 | 2/2019 | Okuyama et al. |
| 2021/0206981 | A1 | 7/2021 | Kidokoro et al. |

FOREIGN PATENT DOCUMENTS

| | | |
|---|---|---|
| JP | 2004261669 A | 9/2004 |
| JP | 2005225940 A | 8/2005 |
| JP | 2013010857 A | 1/2013 |
| JP | 2015-145120 A | 8/2015 |
| JP | 2015178231 A | 10/2015 |
| JP | 2016199722 A | 12/2016 |
| JP | 2018-058280 A | 4/2018 |
| JP | 2019-059052 A | 4/2019 |
| WO | 03091317 A1 | 11/2003 |
| WO | 2009125801 A1 | 10/2009 |
| WO | 2012017866 A1 | 2/2012 |
| WO | 2016017544 A1 | 2/2016 |
| WO | 2016021458 A1 | 2/2016 |

OTHER PUBLICATIONS

Office Action (The First Office Action) dated Jun. 26, 2023, by the National Intellectual Property Administration, P. R. China in corresponding Chinese Patent Application No. 202080090400.X. (17 pages).

Extended European Search Report dated Nov. 27, 2023, by the European Patent Office in corresponding European Patent Application No. 20905709.0. (7 pages).

* cited by examiner

[Fig.1]
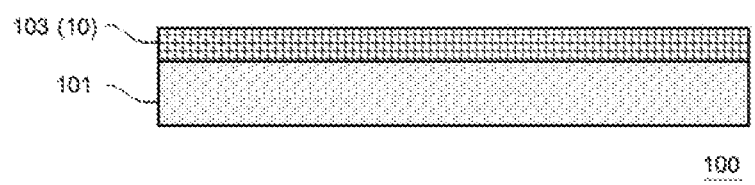
[Fig.2]
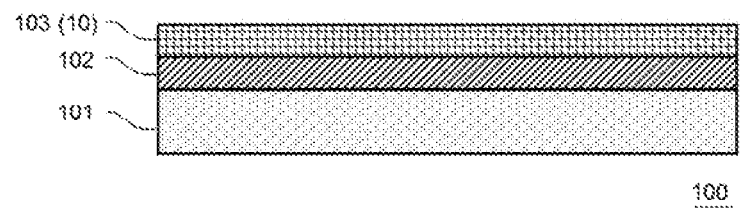

GAS BARRIER COATING MATERIAL, GAS BARRIER FILM, GAS BARRIER LAMINATE, AND METHOD FOR PRODUCING GAS BARRIER LAMINATE

TECHNICAL FIELD

The present invention relates to a gas barrier coating material, a gas barrier film, a gas barrier laminate, and a method for producing a gas barrier laminate.

BACKGROUND ART

As a gas barrier material, a laminate in which an inorganic material layer as a gas barrier layer is provided on a base material layer is used.

However, this inorganic material layer is weak against friction and the like, and in such a gas barrier laminate, cracks may be formed in the inorganic material layer due to scratching or stretching during printing in post-processing, during laminating, or when filling content therein, and the gas barrier properties may decrease.

Therefore, as a gas barrier material, a laminate in which an organic material layer is used as a gas barrier layer is also used.

As a gas barrier material using an organic material layer as a gas barrier layer, a laminate which is provided with a gas barrier layer formed of a mixture including a polycarboxylic acid and a polyamine compound is known.

Examples of techniques related to such a gas barrier laminate include those described in Patent Document 1 (Japanese Unexamined Patent Publication No. 2005-225940), Patent Document 2 (Japanese Unexamined Patent Publication No. 2013-10857), and Patent Document 3 (International Publication No. WO 2016/017544).

Patent Document 1 discloses a gas barrier film which has a gas barrier layer formed of a polycarboxylic acid and a polyamine and/or a polyol and in which the degree of cross-linking of the polycarboxylic acid is equal to or more than 40%.

Patent Document 1 describes that, even under high humidity conditions, such a gas barrier film has excellent gas barrier properties as well as under low humidity conditions.

Patent Document 2 discloses a film formed by coating at least one surface of a base material formed of a plastic film with a mixture prepared by mixing polyamine and polycarboxylic acid so as to be present at a weight ratio of polyamine/polycarboxylic acid=12.5/87.5 to 27.5/72.5.

Patent Document 2 describes that such a gas barrier film has excellent gas barrier properties, in particular, oxygen-blocking properties, even after a boiling treatment, and also has excellent flexibility, transparency, moisture resistance, chemical resistance and the like.

Patent Document 3 discloses a gas barrier coating material that includes a polycarboxylic acid, a polyamine compound, a polyvalent metal compound, and a base, and in which (number of moles of —COO— groups included in the polycarboxylic acid)/(number of moles of amino groups included in the polyamine compound)=100/20 to 100/90.

In Patent Document 3, it is described that when such a gas barrier coating material is used, a gas barrier film having good gas barrier properties, in particular, good oxygen barrier properties, under both low humidity conditions and high humidity conditions, and a laminate thereof can be provided.

RELATED DOCUMENT

Patent Document

[Patent Document 1] Japanese Unexamined Patent Publication No. 2005-225940
[Patent Document 2] Japanese Unexamined Patent Publication No. 2013-10857
[Patent Document 3] International Publication No. WO 2016/017544

SUMMARY OF THE INVENTION

Technical Problem

The technical levels required for the various characteristics of gas barrier materials are becoming higher and higher. The present inventors found the following problems relating to the conventional gas barrier materials as described in Patent Documents 1 to 3.

The gas barrier material as described in Patent Documents 1 to 3 is inferior in terms of productivity since heating at a high temperature for a long time is necessary for the cross-linking of polycarboxylic acid and polyamine.

In addition, it was clear that in such a gas barrier material, when the heat treatment time for cross-linking the polycarboxylic acid and the polyamine is shortened in order to improve the productivity, a ratio of an amide bond formed by cross-linking the polycarboxylic acid and the polyamine is decreased, and the barrier properties deteriorate.

Further, according to the studies by the present inventors, it was clear that when a polyvalent metal compound is used as a cross-linking agent for the polycarboxylic acid instead of the polyamine, there is no need to cross-link the polycarboxylic acid and the polyamine, the heat treatment time can be shortened, and the productivity can be improved, whereas the inter-layer adhesion of the obtained laminate is weakened, and delamination easily occurs.

As described above, the present inventors found that in the conventional gas barrier materials as described in Patent Documents 1 to 3, the balance of barrier properties, delamination resistance, and productivity is not sufficient.

That is, the present inventors found that the conventional gas barrier material has room for improvement from the viewpoint of improving the barrier properties, the delamination resistance, and the productivity in a well-balanced manner.

Note that although there have been many techniques focusing on improving barrier performance, no techniques have been reported so far that improve the barrier properties, the delamination resistance, and the productivity in a well-balanced manner.

The present invention has been made in view of the above circumstances, and an object thereof is to provide a gas barrier material having an excellent balance of barrier properties, delamination resistance, and productivity.

Solution to Problem

The present inventors conducted intensive studies in order to achieve the object described above. As a result, it was found that the gas barrier film formed of a cured product of a mixture including the polycarboxylic acid, the polyamine compound, and the polyvalent metal compound and showing a specific infrared absorption spectrum has an excellent balance of barrier properties, delamination resistance, and productivity, thereby completing the present invention.

That is, according to the present invention, a gas barrier coating material, a gas barrier film, a gas barrier laminate, and a method for producing a gas barrier laminate shown below are provided.

The present inventors have completed the following first to third inventions.

A first invention is as follows.

A gas barrier film formed of a cured product of a mixture including a polycarboxylic acid, a polyamine compound, and a polyvalent metal compound,
  in which in an infrared absorption spectrum of the gas barrier film,
  when a total peak area in a range of an absorption band of equal to or more than 1493 $cm^{-1}$ and equal to or less than 1780 $cm^{-1}$ is set as A,
  a total peak area in a range of an absorption band of equal to or more than 1598 $cm^{-1}$ and equal to or less than 1690 $cm^{-1}$ is set as B,
  a total peak area in a range of an absorption band of equal to or more than 1690 $cm^{-1}$ and equal to or less than 1780 $cm^{-1}$ is set as C, and
  a total peak area in a range of an absorption band of equal to or more than 1493 $cm^{-1}$ and equal to or less than 1598 $cm^{-1}$ is set as D,
  an area ratio of an amide bond represented by B/A is equal to or less than 0.380,
  an area ratio of a carboxylic acid represented by C/A is equal to or less than 0.150, and
  an area ratio of carboxylate represented by D/A is equal to or more than 0.520.

A second invention is as follows.

A gas barrier film formed of a cured product of a gas barrier coating material including a partially neutralized product or a completely neutralized product of a polycarboxylic acid and a volatile base, a polyamine compound, a polyvalent metal compound, and a carbonic acid-based ammonium salt.

A third invention is as follows.

A gas barrier film formed of a cured product of a mixture including a polycarboxylic acid, a polyamine compound, and a polyvalent metal compound,
  in which (number of moles of polyvalent metal derived from the polyvalent metal compound in the cured product)/(number of moles of —COO— groups derived from the polycarboxylic acid in the cured product) is equal to or more than 0.16.

In addition, the present inventors have completed the invention of the following coating material.

A gas barrier coating material including a partially neutralized product or a completely neutralized product of a polycarboxylic acid and a volatile base, a polyamine compound, a polyvalent metal compound, and a carbonic acid-based ammonium salt.

In addition, the present inventors have completed the invention of the following gas barrier laminate.

A gas barrier laminate including:
  a base material layer; and
  a gas barrier layer that is provided on at least one surface of the base material layer and is formed of the gas barrier film according to at least any one of the first to third inventions.

In addition, the present inventors have completed the invention of the following method for producing a gas barrier laminate.

A method for producing the gas barrier laminate including:
  a step of applying the gas barrier coating material to a base material layer and then drying the gas barrier coating material to obtain a coating layer; and
  a step of heating the coating layer and allowing a carboxyl group included in the polycarboxylic acid and an amino group included in the polyamine compound to undergo a dehydration-condensation reaction to form a gas barrier layer having an amide bond.

Advantageous Effects of Invention

According to the present invention, it is possible to provide a gas barrier material having an excellent balance of barrier properties, delamination resistance, and productivity.

BRIEF DESCRIPTION OF THE DRAWINGS

FIG. 1 is a cross-sectional view schematically showing an example of a structure of a gas barrier laminate including a gas barrier layer formed of a gas barrier film according to first to third embodiments.

FIG. 2 is a cross-sectional view schematically showing the example of the structure of the gas barrier laminate including the gas barrier layer formed of the gas barrier film according to the first to third embodiments.

DESCRIPTION OF EMBODIMENTS

Description will be given below of embodiments of the first to third inventions with reference to the drawings. Note that, the figures are schematic views and do not match the actual size ratios. Note that, "to" between numbers in the sentences means "equal to or more than first number and equal to or less than second number" unless otherwise specified.

In the present specification, the embodiment according to the first invention may be referred to as a first embodiment, the embodiment according to the second invention may be referred to as a second embodiment, and the embodiment according to the third invention may be referred to as a third embodiment.

<Gas Barrier Film>

First Embodiment

The gas barrier film according to the first embodiment is a gas barrier film formed of a cured product of a mixture including a polycarboxylic acid, a polyamine compound, and a polyvalent metal compound, in which in an infrared absorption spectrum of the gas barrier film, when a total peak area in a range of an absorption band of equal to or more than 1493 $cm^{-1}$ and equal to or less than 1780 $cm^{-1}$ is set as A, a total peak area in a range of an absorption band of equal to or more than 1598 $cm^{-1}$ and equal to or less than 1690 $cm^{-1}$ is set as B, a total peak area in a range of an absorption band of equal to or more than 1690 $cm^{-1}$ and equal to or less than 1780 $cm^{-1}$ is set as C, and a total peak area in a range of an absorption band of equal to or more than 1493 $cm^{-1}$ and equal to or less than 1598 $cm^{-1}$ is set as D, an area ratio of an amide bond represented by B/A is equal to or less than 0.380, an area ratio of a carboxylic acid represented by C/A is equal to or less than 0.150, and an area ratio of carboxylate represented by D/A is equal to or more than 0.520.

The gas barrier film according to the first embodiment is obtained by, for example, applying a gas barrier coating material to a base material layer or an inorganic material layer, then carrying out drying and a heat treatment, and curing the gas barrier coating material to form a gas barrier layer. That is, the gas barrier film according to the first embodiment is obtained by curing the gas barrier coating material.

In addition, in the infrared absorption spectrum of a gas barrier film 10 or a gas barrier layer 103 according to the first embodiment, when the total peak area in a range of an absorption band of equal to or more than 1493 $cm^{-1}$ and equal to or less than 1780 $cm^{-1}$ is set as A, and the total peak area in a range of an absorption band of equal to or more than 1598 $cm^{-1}$ and equal to or less than 1690 $cm^{-1}$ is set as B, the area ratio of the amide bond represented by B/A is preferably equal to or less than 0.370, more preferably equal to or less than 0.360, and even more preferably equal to or less than 0.350 from the viewpoint of further improving the balance of barrier properties, delamination resistance, and productivity. Further, the lower limit of the area ratio of the amide bond represented by B/A is preferably equal to or more than 0.235, more preferably equal to or more than 0.250, even more preferably equal to or more than 0.270, still even more preferably equal to or more than 0.290, and particularly preferably equal to or more than 0.310 from the viewpoint of further improving the gas barrier performance under high humidity, the gas barrier performance after a retort treatment, the gas barrier performance in a case of acidic content filling, and the like.

Further, in the infrared absorption spectrum of the gas barrier film 10 or the gas barrier layer 103 according to the first embodiment, when the total peak area in a range of an absorption band of equal to or more than 1690 $cm^{-1}$ and equal to or less than 1780 $cm^{-1}$ is set as C, the area ratio of the carboxylic acid represented by C/A is preferably equal to or less than 0.120, more preferably equal to or less than 0.100, even more preferably equal to or less than 0.080, and particularly preferably equal to or less than 0.060 from the viewpoint of further improving the gas barrier performance under high humidity, the gas barrier performance after a retort treatment, the gas barrier performance in a case of acidic content filling, and the like.

The lower limit of the area ratio of the carboxylic acid represented by the above C/A is not particularly limited, and is, for example, equal to or more than 0.0001.

Further, in the infrared absorption spectrum of a gas barrier film 10 or the gas barrier layer 103 according to the first embodiment, when a total peak area in a range of an absorption band of equal to or more than 1493 $cm^{-1}$ and equal to or less than 1598 $cm^{-1}$ is set as D, the area ratio of the carboxylate represented by D/A is preferably equal to or more than 0.550, more preferably equal to or more than 0.580, and even more preferably equal to or more than 0.600 from the viewpoint of further improving the balance of barrier properties, delamination resistance, and productivity.

Further, the upper limit of the area ratio of the carboxylate represented by the above D/A is preferably equal to or less than 0.750, more preferably equal to or less than 0.720, even more preferably equal to or less than 0.700, and still even more preferably equal to or less than 0.680 from the viewpoint of further improving the gas barrier performance under high humidity, the gas barrier performance after a retort treatment, the gas barrier performance in a case of acidic content filling, and the like.

In the gas barrier film or the gas barrier layer according to the first embodiment, absorption based on $vC=O$ of the unreacted carboxylic acid in the infrared absorption spectrum is observed in the vicinity of 1700 $cm^{-1}$, absorption based on $vC=O$ of the amide bond which is a cross-linked structure is observed in the vicinity of 1630 to 1685 $cm^{-1}$, and absorption based on $vC=O$ of the carboxylate is observed in the vicinity of 1540 to 1560 $cm^{-1}$.

That is, in the first embodiment, it is considered that, in the infrared absorption spectrum, the total peak area A in a range of an absorption band of equal to or more than 1493 $cm^{-1}$ and equal to or less than 1780 $cm^{-1}$ represents an index of the total amount of carboxylic acid, the amide bond, and the carboxylate, and the total peak area B in a range of an absorption band of equal to or more than 1598 $cm^{-1}$ and equal to or less than 1690 $cm^{-1}$ represents an index of the amount of the amide bond present. Further, it is considered that the total peak area C in a range of an absorption band of equal to or more than 1690 $cm^{-1}$ and equal to or less than 1780 $cm^{-1}$ represents an index of the amount of the unreacted carboxylic acid present and the total peak area D in a range of an absorption band of equal to or more than 1493 $cm^{-1}$ and equal to or less than 1598 $cm^{-1}$ represents an index of the amount of carboxylate present.

Note that in the first embodiment, the total peak areas A to D can be measured by the following procedure.

First, a 1 cm×3 cm measurement sample is cut out from the gas barrier film or the gas barrier layer. Next, the infrared absorption spectrum of the surface of the gas barrier film or the gas barrier layer is obtained by infrared total reflection measurement (ATR method). From the obtained infrared absorption spectrum, the total peak areas A to D described above are calculated by the following procedures (1) to (4).

(1) The absorbances at 1780 $cm^{-1}$ and at 1493 $cm^{-1}$ are connected by a straight line (N), and the area surrounded by the absorption spectrum in the range of an absorption band of equal to or more than 1493 $cm^{-1}$ and equal to or less than 1780 $cm^{-1}$ and N is set as the total peak area A.

(2) A straight line (O) is drawn down orthogonally from an absorbance (Q) at 1690 $cm^{-1}$, an intersection point of N and O is set as P, a straight line (S) is drawn down orthogonally from an absorbance (R) at 1598 $cm^{-1}$, an intersection point of N and S is set as T, and the area which is surrounded by the absorption spectrum in the range of an absorption band of equal to or more than 1598 $cm^{-1}$ and equal to or less than 1690 $cm^{-1}$, the straight line S, the point T, the straight line N, the point P, the straight line O, the absorbance Q, and the absorbance R is set as the total peak area B.

(3) The area which is surrounded by the absorption spectrum in the range of an absorption band of equal to or more than 1690 $cm^{-1}$ and equal to or less than 1780 $cm^{-1}$, the absorbance Q, the straight line O, the point P, and the straight line N is set as the total peak area C.

(4) The area which is surrounded by the absorption spectrum in the range of an absorption band of equal to or more than 1493 $cm^{-1}$ and equal to or less than 1598 $cm^{-1}$, the absorbance R, the straight line S, the point T, and the straight line N is set as the total peak area D.

Next, the area ratios B/A, C/A, and D/A are obtained from the areas obtained by the above method.

Note that, it is possible to perform the measurement of the infrared absorption spectrum of the first embodiment (infrared total reflection measurement: ATR method), for example, under the conditions of an incident angle of 45 degrees, room temperature, a resolution of 4 $cm^{-1}$, and a cumulative number of 100 times by mounting a PKM-GE-S (Germanium) crystal and using an IRT-5200 apparatus manufactured by JASCO Corporation.

It is possible to control the area ratio of the amide bond which is indicated by B/A, the area ratio of the carboxylic acid which is indicated by C/A, and the area ratio of the carboxylate which is indicated by D/A of the gas barrier film or the gas barrier layer according to the first embodiment by appropriately adjusting the manufacturing conditions of the gas barrier film or the gas barrier layer.

In the first embodiment, in particular, the blending ratio of the polycarboxylic acid and the polyamine compound, the method of preparing the gas barrier coating material, the method, temperature, time, and the like of the heat treatment of the gas barrier coating material are examples of factors for controlling the area ratio of the amide bond indicated by B/A, the area ratio of the carboxylic acid indicated by C/A, and the area ratio of the carboxylate indicated by D/A.

In the first embodiment, (number of moles of polyvalent metal compound in the gas barrier coating material)/(number of moles of —COO— groups included in the polycarboxylic acid in the gas barrier coating material), that is, (number of moles polyvalent metal derived from the polyvalent metal compound in the cured product)/(number of moles of —COO— groups derived from the polycarboxylic acid in the cured product) is preferably equal to or more than 0.16, more preferably equal to or more than 0.18, even more preferably equal to or more than 0.20, still even more preferably equal to or more than 0.25, still even more preferably equal to or more than 0.30, and still even more preferably equal to or more than 0.35.

By setting (number of moles of polyvalent metal compound in the gas barrier coating material)/(number of moles of —COO— groups included in the polycarboxylic acid in the gas barrier coating material) to be equal to or more than the above lower limit value, it is possible to further improve the gas barrier performance under high humidity, the gas barrier performance after a retort treatment, the gas barrier performance in a case of acidic content filling, and the like.

Here, according to the studies by the present inventors, it was found that in a case of using polyamide having hygroscopicity or the like as the base material layer, the gas barrier performance under high humidity, the gas barrier performance after a retort treatment, and the gas barrier performance in a case of acidic content filling, and the like deteriorate. However, by setting (number of moles of polyvalent metal compound in the gas barrier coating material)/(number of moles of —COO— groups included in the polycarboxylic acid in the gas barrier coating material) to be equal to or more than the above lower limit value, even in a case of using polyamide having hygroscopicity or the like as the base material layer, it is possible to improve the gas barrier performance under high humidity, the gas barrier performance after a retort treatment, the gas barrier performance in a case of acidic content filling, and the like.

On the other hand, (number of moles of polyvalent metal compound in the gas barrier coating material)/(number of moles of —COO— groups included in the polycarboxylic acid in the gas barrier coating material), that is, (number of moles of polyvalent metal derived from the polyvalent metal compound in the cured product)/(number of moles of —COO— groups derived from the polycarboxylic acid in the cured product) is preferably equal to or less than 0.80, more preferably equal to or less than 0.70, even more preferably equal to or less than 0.60, and still even more preferably equal to or less than 0.50.

By setting (number of moles of polyvalent metal compound in the gas barrier coating material)/(number of moles of —COO— groups included in the polycarboxylic acid in the gas barrier coating material) to be equal to or less than the above upper limit value, it is possible to further improve the gas barrier performance under high humidity, the gas barrier performance after a retort treatment, the gas barrier performance in a case of acidic content filling, and the like.

According to the first embodiment, it is possible to obtain a gas barrier film and a gas barrier laminate having excellent barrier properties and delamination resistance even when the heat treatment time is short. That is, according to the first embodiment, it is possible to provide a gas barrier material having an excellent balance of barrier properties, delamination resistance, and productivity.

(Polycarboxylic Acid)

The polycarboxylic acid has two or more carboxyl groups in the molecule. Specific examples thereof include homopolymers of α,β-unsaturated carboxylic acid such as acrylic acid, methacrylic acid, itaconic acid, fumaric acid, crotonic acid, cinnamic acid, 3-hexenoic acid, and 3-hexenedioic acid, or copolymers thereof. In addition, the polycarboxylic acid may be a copolymer of the α,β-unsaturated carboxylic acid described above and esters such as ethyl ester, olefins such as ethylene, or the like.

Among these, a homopolymer of acrylic acid, methacrylic acid, itaconic acid, fumaric acid, crotonic acid, and cinnamic acid or a copolymer thereof is preferable, one type or two or more types of polymers selected from polyacrylic acid, polymethacrylic acid, and a copolymer of acrylic acid and methacrylic acid is more preferable, at least one type of polymer selected from polyacrylic acid and polymethacrylic acid is even more preferable, and at least one type of polymer selected from a homopolymer of acrylic acid or a homopolymer of methacrylic acid is particularly preferable.

Here, in the first embodiment, polyacrylic acid includes both a homopolymer of acrylic acid and a copolymer of acrylic acid and another monomer. Ina case of a copolymer of acrylic acid and another monomer, the polyacrylic acid generally includes constituent units which are derived from acrylic acid at 90% by mass or more, preferably 95% by mass or more, and more preferably 99% by mass or more in 100% by mass of the polymer.

In addition, in the first embodiment, polymethacrylic acid includes both a homopolymer of methacrylic acid and a copolymer of methacrylic acid and another monomer. In a case of a copolymer of methacrylic acid and another monomer, the polymethacrylic acid generally includes constituent units which are derived from methacrylic acid at 90% by mass or more, preferably 95% by mass or more, and more preferably 99% by mass or more in 100% by mass of the polymer.

The polycarboxylic acid according to the first embodiment is a polymer obtained by polymerizing carboxylic acid monomers, and the molecular weight of the polycarboxylic acid is preferably 500 to 2,500,000, more preferably 5,000 to 2,000,000, even more preferably 10,000 to 1,500,000, and still even more preferably 100,000 to 1,200,000 from the viewpoint of excellent balance of gas barrier properties and handleability.

Here, in the first embodiment, the molecular weight of the polycarboxylic acid is the polyethylene oxide conversion weight average molecular weight and is measurable using gel permeation chromatography (GPC).

In the first embodiment, it is possible to suppress gelation from occurring by neutralizing the polycarboxylic acid with the volatile base when mixing a polyvalent metal compound or a polyamine compound and polycarboxylic acid. Accordingly, in the polycarboxylic acid, from the viewpoint of prevention of gelation, a volatile base is preferably used for the partially neutralized product or completely neutralized product of the carboxyl group. It is possible to obtain the neutralized product by partially or completely neutralizing the carboxyl group of the polycarboxylic acid with a volatile base, (that is, the carboxyl group of the polycarboxylic acid is partially or completely made into carboxylate). Due to this, it is possible to prevent gelation when adding a polyamine compound and a polyvalent metal compound.

A partially neutralized product is prepared by adding a volatile base to an aqueous solution of polycarboxylic acid polymer and it is possible to set a desired neutralization degree by adjusting the ratio of the amounts of the polycarboxylic acid and the volatile base. In the first embodiment, from the viewpoint of sufficiently suppressing gelation caused by the neutralization reaction with the amino group of the polyamine compound, the neutralization degree of the polycarboxylic acid by the volatile base is preferably 70 to 300 equivalent %, more preferably 90 to 250 equivalent %, and even more preferably 100 to 200 equivalent %.

It is possible to use an arbitrary water-soluble base as a volatile base.

Examples of volatile bases include ammonia, morpholine, alkylamine, 2-dimethyl amino ethanol, N-methyl monopholine, ethylene diamine, and tertiary amines such as triethyl amine, an aqueous solution thereof or a mixture thereof. From the viewpoint of obtaining good gas barrier properties, an ammonia aqueous solution is preferable.

(Polyamine Compound)

The gas barrier coating material according to the first embodiment includes a polyamine compound. When the gas barrier coating material includes the polyamine compound, the barrier properties of the obtained gas barrier material can be improved, the inter-layer adhesion of the obtained gas barrier laminate can be improved, and the delamination resistance can be improved.

The polyamine compound according to the first embodiment is a polymer having two or more amino groups in the main chain, side chain or terminal. Specific examples thereof include aliphatic polyamines such as polyallylamine, polyvinylamine, polyethyleneimine, and poly(trimethyleneimine); polyamides having amino groups on side chains such as polylysine and polyarginine; and the like. In addition, a polyamine where a portion of the amino group is modified may be used. From the viewpoint of obtaining good gas barrier properties, polyethyleneimine is more preferable.

From the viewpoint of excellent balance of gas barrier properties and handleability, the number average molecular weight of the polyamine compound according to the first embodiment is preferably 50 to 2,000,000, more preferably 100 to 1,000,000, even more preferably 1,500 to 500,000, still even more preferably 1,500 to 100,000, still even more preferably 1,500 to 50,000, still even more preferably 3,500 to 20,000, still even more preferably 5,000 to 15,000, and particularly preferably 7,000 to 12,000.

Here, in the first embodiment, it is possible to measure the molecular weight of the polyamine compound using a boiling point increasing method or a viscosity method.

A polyvalent metal compound is a metal and a metal compound which belongs to Group 2 to 13 in the periodic table and, in detail, a divalent or higher valency metal such as magnesium (Mg), calcium (Ca), strontium (Sr), barium (Ba), iron (Fe), cobalt (Co), nickel (Ni), copper (Cu), zinc (Zn), and aluminum (Al), and oxides, hydroxides, halogenides, carbonates, phosphates, phosphites, hypophosphites, sulfates, or sulfites of these metals, or the like. From the point of view of water resistance, impurities, and the like, a metal oxide or a metal hydroxide is preferable.

Among the above divalent or higher valency metals, Mg, Ca, Zn, Ba and Al, and particularly Zn are preferable. Among the above metal compounds, divalent or higher valency metal compounds are preferable, and divalent metal compounds such as magnesium oxide, calcium oxide, barium oxide, zinc oxide, magnesium hydroxide, calcium hydroxide, barium hydroxide, and zinc hydroxide are more preferable, zinc oxide and zinc hydroxide are even more preferable, and zinc oxide is particularly preferable.

Among these polyvalent metal compounds, at least one type of polyvalent metal compound may be used, and one type or two more types thereof may be used.

In the first embodiment, (number of moles of amino groups included in the polyamine compound in the gas barrier coating material)/(number of moles of —COO— groups included in the polycarboxylic acid in the gas barrier coating material), that is, (number of moles of amino groups derived from the polyamine compound in the cured product)/(number of moles of —COO— groups derived from the polycarboxylic acid in the cured product) is preferably equal to or more than 20/100, more preferably equal to or more than 25/100, even more preferably equal to or more than 30/100, still even more preferably equal to or more than 35/100, and particularly preferably equal to or more than 40/100. By setting (number of moles of amino groups included in the polyamine compound in the gas barrier coating material)/(number of moles of —COO— groups included in the polycarboxylic acid in the gas barrier coating material) to be equal to or more than the above lower limit value, it is possible to further improve the gas barrier performance under high humidity, the gas barrier performance after a retort treatment, the gas barrier performance in a case of acidic content filling, and the like.

On the other hand, (number of moles of amino groups included in the polyamine compound in the gas barrier coating material)/(number of moles of —COO— groups included in the polycarboxylic acid in the gas barrier coating material), that is, (number of moles of amino groups derived from the polyamine compound in the cured product)/(number of moles of —COO— groups derived from the polycarboxylic acid in the cured product) is preferably equal to or less than 90/100, more preferably equal to or less than 85/100, even more preferably equal to or less than 80/100, still even more preferably equal to or less than 75/100, and particularly preferably equal to or less than 70/100. By setting (number of moles of amino groups included in the polyamine compound in the gas barrier coating material)/(number of moles of —COO— groups included in the polycarboxylic acid in the gas barrier coating material) to be equal to or less than the above upper limit value, it is possible to further improve the gas barrier performance under high humidity, the gas barrier performance after a retort treatment, the gas barrier performance in a case of acidic content filling, and the like.

Details of the reason are not clear; however, it is considered that it is possible to obtain a gas barrier film or a gas barrier laminate having excellent gas barrier performance under both high humidity, gas barrier performance after a retort treatment, and gas barrier performance in a case of acidic content filling by forming a well-balanced fine structure by amide cross-linking using amino groups which form a polyamine compound and metal cross-linking using polyvalent metals which form a salt of polycarboxylic acid and polyvalent metal.

It is preferable that the gas barrier coating material according to the first embodiment further includes a carbonic acid-based ammonium salt. The carbonic acid-based ammonium salt is added to bring the polyvalent metal compound into the form of a polyvalent metal ammonium carbonate complex to improve the solubility of the polyvalent metal compound and to prepare a uniform solution containing the polyvalent metal compound. When the gas barrier coating material according to the first embodiment includes the carbonic acid-based ammonium salt, the amount of the polyvalent metal compound dissolved can be increased, and as a result, even when (number of moles of polyvalent metal compound in the gas barrier coating material)/(number of moles of —COO— groups included in the polycarboxylic acid in the gas barrier coating material) is set to be equal to or more than the above lower limit value, a uniform gas barrier coating material can be obtained.

Examples of the carbonic acid-based ammonium salt include ammonium carbonate, and ammonium hydrogencarbonate, and the like, and ammonium carbonate is preferable from the viewpoint that the component easily volatilizes and does not easily remain in the obtained gas barrier layer.

(Number of moles of carbonic acid-based ammonium salt in the gas barrier coating material)/(number of moles of polyvalent metal compound in the gas barrier coating material) is preferably equal to or more than 0.05, more preferably equal to or more than 0.10, and even more preferably equal to or more than 0.25, still even more preferably equal to or more than 0.50, and particularly preferably equal to or more than 0.75. This makes it possible to further improve the solubility of the polyvalent metal compound.

On the other hand, (number of moles of carbonic acid-based ammonium salt in the gas barrier coating material)/(number of moles of polyvalent metal compound in the gas barrier coating material) is preferably equal to or less than 10.0, more preferably equal to or less than 5.0, even more preferably equal to or less than 2.0, and still even more preferably equal to or less than 1.5. Due to this, the coatability of the gas barrier coating material according to the first embodiment can be further improved.

In addition, from the viewpoint of improving coatability, the solid content concentration of the gas barrier coating material is preferably set to 0.5 to 15% by mass, and more preferably 1 to 10% by mass.

In addition, it is preferable to further add a surfactant to the gas barrier coating material from the viewpoint of suppressing the occurrence of cissing when the gas barrier coating material is applied. The addition amount of the surfactant is preferably 0.01 to 3% by mass, and more preferably 0.01 to 1% by mass, based on 100% by mass of the total solid content of the gas barrier coating material.

Examples of the surfactant according to the first embodiment include an anionic surfactant, a non-ionic surfactant, a cationic surfactant, an amphoteric surfactant and the like, and, from the viewpoint of obtaining good coatability, non-ionic surfactants are preferable, and polyoxyethylene alkyl ethers are more preferable.

Examples of the non-ionic surfactants include polyoxyalkylene alkylaryl ethers, polyoxyalkylene alkyl ethers, polyoxyalkylene fatty acid esters, sorbitan fatty acid esters, silicone-based surfactants, acetylene alcohol-based surfactants, fluorine-containing surfactants, and the like.

Examples of the polyoxyalkylene alkylaryl ethers include polyoxyethylene nonyl phenyl ether, polyoxyethylene octyl phenyl ether, polyoxyethylene dodecyl phenyl ether, and the like.

Examples of the polyoxyalkylene alkyl ethers include polyoxyethylene alkyl ethers such as polyoxyethylene oleyl ether and polyoxyethylene lauryl ether.

Examples of the polyoxyalkylene fatty acid esters include polyoxyethylene oleic acid esters, polyoxyethylene lauric acid esters, polyoxyethylene distearic acid esters, and the like.

Examples of sorbitan fatty acid esters include sorbitan laurate, sorbitan monostearate, sorbitan monooleate, sorbitan sesquioleate, polyoxyethylene monooleate, polyoxyethylene stearate, and the like.

Examples of silicone-based surfactants include dimethylpolysiloxane and the like.

Examples of acetylene alcohol-based surfactants include 2,4,7,9-tetramethyl-5-decyne-4,7-diol, 3,6-dimethyl-4-octyne-3,6-diol, 3,5-dimethyl-1-hexyne-301, and the like.

Examples of fluorine-containing surfactants include fluorine alkyl ester and the like.

The gas barrier coating material according to the first embodiment may include other additives in a range in which the object of the present invention is not impaired. For example, various additives such as lubricants, slip agents, anti-blocking agents, antistatic agents, anti-fogging agents, pigments, dyes, and inorganic or organic fillers may be added.

For example, it is possible to prepare the gas barrier coating material according to the first embodiment as follows.

First, the carboxyl groups of the polycarboxylic acid are completely or partially neutralized by adding a volatile base to the polycarboxylic acid. Further, a polyvalent metal salt compound and a carbonic acid-based ammonium salt are mixed, and a metal salt is formed in all or some of the carboxyl groups of the polycarboxylic acid neutralized with the volatile base and the carboxyl groups of the polycarboxylic acid not neutralized with the volatile base described above. Then, a polyamine compound is further added thereto to obtain a gas barrier coating material. Mixing the polycarboxylic acid, the polyvalent metal salt compound, the carbonic acid-based ammonium salt, and the polyamine compound in such a procedure makes it possible to suppress the generation of agglomerates and to obtain a uniform gas barrier coating material. This makes it possible to more effectively advance the dehydration-condensation reaction between the —COO— group included in the polycarboxylic acid and the amino group included in the polyamine compound.

More details are as follows.

First, a completely or partially neutralized solution of carboxyl groups which form the polycarboxylic acid is prepared.

A volatile base is added to the polycarboxylic acid and the carboxyl groups of the polycarboxylic acid are completely neutralized or partially neutralized. By neutralizing the carboxyl groups of the polycarboxylic acid, gelation which is caused by to the reaction of the carboxyl groups which form the polycarboxylic acid, a polyvalent metal compound, and amino groups which form a polyamine compound when adding the polyvalent metal compound or the polyamine compound is effectively prevented, and it is possible to obtain a uniform gas barrier coating material.

Subsequently, a polyvalent metal salt compound and a carbonic acid-based ammonium salt are added thereto and dissolved and a polyvalent metal salt with —COO— groups which form polycarboxylic acid is formed by the polyvalent metal ions which are produced. At this time, the —COO— groups which form a salt with the polyvalent metal ions refer to both carboxyl groups which are not neutralized with the base and —COO— groups which are neutralized with a base described above. In a case of the —COO— groups which are neutralized with a base, polyvalent metal ions which are derived from the polyvalent metal compound described above are replaced and oriented to form a polyvalent metal salt of a —COO— group. Then, it is possible to obtain a gas barrier coating material by further adding a polyamine compound after forming a polyvalent metal salt.

The gas barrier coating material thus produced is applied onto the base material layer, dried and cured to form a gas barrier layer. At this time, the polyvalent metal of the polyvalent metal salt of the —COO— groups forming the polycarboxylic acid forms metal cross-linking, and amide cross-linking is formed by amino groups which form the polyamine to obtain a gas barrier layer which has excellent gas barrier properties.

Second Embodiment

A gas barrier film formed of a cured product of a gas barrier coating material according to a second embodiment includes a partially neutralized product or a completely neutralized product of a polycarboxylic acid and a volatile base, a polyamine compound, a polyvalent metal compound, and a carbonic acid-based ammonium salt.

According to the gas barrier coating material used for the cured product forming the gas barrier film of the second embodiment, a gas barrier film and a gas barrier laminate having excellent barrier properties and delamination resistance can be obtained even when the heat treatment time is short. That is, according to the gas barrier coating material used for the cured product forming the gas barrier film of the second embodiment, it is possible to provide a gas barrier material having an excellent balance of barrier properties, delamination resistance, and productivity.

(Polycarboxylic Acid)

The polycarboxylic acid has two or more carboxyl groups in the molecule. Specific examples thereof include homopolymers of α,β-unsaturated carboxylic acid such as acrylic acid, methacrylic acid, itaconic acid, fumaric acid, crotonic acid, cinnamic acid, 3-hexenoic acid, and 3-hexenedioic acid, or copolymers thereof. In addition, the polycarboxylic acid may be a copolymer of the α,β-unsaturated carboxylic acid described above and esters such as ethyl ester, olefins such as ethylene, or the like.

Among these, a homopolymer of acrylic acid, methacrylic acid, itaconic acid, fumaric acid, crotonic acid, and cinnamic acid or a copolymer thereof is preferable, one type or two or more types of polymers selected from polyacrylic acid, polymethacrylic acid, and a copolymer of acrylic acid and methacrylic acid is more preferable, at least one type of polymer selected from polyacrylic acid and polymethacrylic acid is even more preferable, and at least one type of polymer selected from a homopolymer of acrylic acid or a homopolymer of methacrylic acid is particularly preferable.

Here, in the second embodiment, polyacrylic acid includes both a homopolymer of acrylic acid and a copolymer of acrylic acid and another monomer. Ina case of a copolymer of acrylic acid and another monomer, the polyacrylic acid generally includes constituent units which are derived from acrylic acid at 90% by mass or more, preferably 95% by mass or more, and more preferably 99% by mass or more in 100% by mass of the polymer.

Further, in the gas barrier coating material used for the cured product forming the gas barrier film of the second embodiment, polymethacrylic acid includes both a homopolymer of methacrylic acid and a copolymer of methacrylic acid and another monomer. In a case of a copolymer of methacrylic acid and another monomer, the polymethacrylic acid generally includes constituent units which are derived from methacrylic acid at 90% by mass or more, preferably 95% by mass or more, and more preferably 99% by mass or more in 100% by mass of the polymer.

The polycarboxylic acid according to in the gas barrier coating material used for the cured product forming the gas barrier film of the second embodiment is a polymer obtained by polymerizing carboxylic acid monomers, and the molecular weight of the polycarboxylic acid is preferably 500 to 2,500,000, more preferably 5,000 to 2,000,000, even more preferably 10,000 to 1,500,000, and still even more preferably 100,000 to 1,200,000 from the viewpoint of excellent balance of gas barrier properties and handleability.

Here, in the gas barrier coating material used for the cured product forming the gas barrier film of the second embodiment, the molecular weight of the polycarboxylic acid is the polyethylene oxide conversion weight average molecular weight and is measurable using gel permeation chromatography (GPC).

It is possible to suppress gelation from occurring by neutralizing the polycarboxylic acid with the volatile base according to the gas barrier coating material used for the cured product forming the gas barrier film of the second embodiment when mixing a polyvalent metal compound or a polyamine compound and polycarboxylic acid. Accordingly, in the polycarboxylic acid, from the viewpoint of prevention of gelation, a volatile base is preferably used for the partially neutralized product or completely neutralized product of the carboxyl group. It is possible to obtain the neutralized product by partially or completely neutralizing the carboxyl group of the polycarboxylic acid with a volatile base, (that is, the carboxyl group of the polycarboxylic acid is partially or completely made into carboxylate). Due to this, it is possible to prevent gelation when adding a polyamine compound and a polyvalent metal compound.

A partially neutralized product is prepared by adding a volatile base to an aqueous solution of polycarboxylic acid polymer and it is possible to set a desired neutralization degree by adjusting the ratio of the amounts of the polycarboxylic acid and the volatile base. In the gas barrier coating material used for the cured product forming the gas barrier film of the second embodiment, from the viewpoint of sufficiently suppressing gelation caused by the neutralization reaction with the amino group of the polyamine compound, the neutralization degree of the polycarboxylic acid by the volatile base is preferably 70 to 300 equivalent %, more preferably 90 to 250 equivalent %, and even more preferably 100 to 200 equivalent %.

It is possible to use an arbitrary water-soluble base as a volatile base.

Examples of volatile bases include ammonia, morpholine, alkylamine, 2-dimethyl amino ethanol, N-methyl monopholine, ethylene diamine, and tertiary amines such as triethyl amine, an aqueous solution thereof or a mixture thereof. From the viewpoint of obtaining good gas barrier properties, an ammonia aqueous solution is preferable.

(Polyamine Compound)

The gas barrier coating material used for the cured product forming the gas barrier film of the second embodiment includes a polyamine compound. When the gas barrier coating material includes the polyamine compound, the barrier properties of the obtained gas barrier material can be improved, the inter-layer adhesion of the obtained gas barrier laminate can be improved, and the delamination resistance can be improved.

The polyamine compound according to the gas barrier coating material used for the cured product forming the gas barrier film of the second embodiment is a polymer having two or more amino groups at the main chain, side chain or terminal. Specific examples thereof include aliphatic polyamines such as polyallylamine, polyvinylamine, polyethyleneimine, and poly(trimethyleneimine); polyamides having amino groups onside chains such as polylysine and polyarginine; and the like. In addition, a polyamine where a portion of the amino group is modified may be used. From the viewpoint of obtaining good gas barrier properties, polyethyleneimine is more preferable.

From the viewpoint of excellent balance of gas barrier properties and handleability, the number average molecular weight of the polyamine compound according to the gas barrier coating material used in the cured product forming the gas barrier film of the second embodiment is preferably 50 to 2,000,000, more preferably 100 to 1,000,000, even more preferably 1,500 to 500,000, still even more preferably 1,500 to 100,000, still even more preferably 1,500 to 50,000, still even more preferably 3,500 to 20,000, still even more preferably 5,000 to 15,000, and particularly preferably 7,000 to 12,000.

Here, in the gas barrier coating material used for the cured product forming the gas barrier film of the second embodiment, the molecular weight of the polyamine compound can be measured by using a boiling point increasing method or a viscosity method.

A polyvalent metal compound is a metal and a metal compound which belongs to Group 2 to 13 in the periodic table and, in detail, a divalent or higher valency metal such as magnesium (Mg), calcium (Ca), strontium (Sr), barium (Ba), iron (Fe), cobalt (Co), nickel (Ni), copper (Cu), zinc (Zn), and aluminum (Al), and oxides, hydroxides, halogenides, carbonates, phosphates, phosphites, hypophosphites, sulfates, or sulfites of these metals, or the like. From the point of view of water resistance, impurities, and the like, a metal oxide or a metal hydroxide is preferable.

Among the above divalent or higher valency metals, Mg, Ca, Zn, Ba and Al, and particularly Zn are preferable. Among the above metal compounds, divalent or higher valency metal compounds are preferable, and divalent metal compounds such as magnesium oxide, calcium oxide, barium oxide, zinc oxide, magnesium hydroxide, calcium hydroxide, barium hydroxide, and zinc hydroxide are more preferable, zinc oxide and zinc hydroxide are even more preferable, and zinc oxide is particularly preferable.

Among these polyvalent metal compounds, at least one type of polyvalent metal compound may be used, and one type or two more types thereof may be used.

In the gas barrier coating material used for the cured product forming the gas barrier film of the second embodiment, (number of moles of amino groups included in the polyamine compound in the gas barrier coating material)/(number of moles of —COO— groups included in the polycarboxylic acid in the gas barrier coating material) is preferably equal to or more than 20/100, more preferably equal to or more than 25/100, even more preferably equal to or more than 30/100, still even more preferably equal to or more than 35/100, and particularly preferably equal to or more than 40/100. By setting (number of moles of amino groups included in the polyamine compound in the gas barrier coating material)/(number of moles of —COO— groups included in the polycarboxylic acid in the gas barrier coating material) to be equal to or more than the above lower limit value, it is possible to further improve the gas barrier performance under high humidity, the gas barrier performance after a retort treatment, the gas barrier performance in a case of acidic content filling, and the like.

On the other hand, (number of moles of amino groups included in the polyamine compound in the gas barrier coating material)/(number of moles of —COO— groups included in the polycarboxylic acid in the gas barrier coating material) is preferably equal to or less than 90/100, more preferably equal to or less than 85/100, even more preferably equal to or less than 80/100, still even more preferably equal to or less than 75/100, and particularly preferably equal to or less than 70/100. By setting (number of moles of amino groups included in the polyamine compound in the gas barrier coating material)/(number of moles of —COO— groups included in the polycarboxylic acid in the gas barrier coating material) to be equal to or less than the above upper limit value, it is possible to further improve the gas barrier performance under high humidity, the gas barrier performance after a retort treatment, the gas barrier performance in a case of acidic content filling, and the like.

Details of the reason are not clear; however, it is considered that it is possible to obtain a gas barrier film or a gas barrier laminate having excellent gas barrier performance under both high humidity, gas barrier performance after a retort treatment, and gas barrier performance in a case of acidic content filling by forming a well-balanced fine structure by amide cross-linking using amino groups which form a polyamine compound and metal cross-linking using polyvalent metals which form a salt of polycarboxylic acid and polyvalent metal.

Further, in the gas barrier coating material used for the cured product forming the gas barrier film of the second embodiment, (number of moles of polyvalent metal compound in the gas barrier coating material)/(number of moles of —COO— groups included in the polycarboxylic acid in the gas barrier coating material) is preferably equal to or more than 0.16, more preferably equal to or more than 0.18, even more preferably equal to or more than 0.20, still even more preferably equal to or more than 0.25, still even more preferably equal to or more than 0.30, and still even more preferably equal to or more than 0.35.

By setting (number of moles of polyvalent metal compound in the gas barrier coating material)/(number of moles of —COO— groups included in the polycarboxylic acid in the gas barrier coating material) to be equal to or more than the above lower limit value, it is possible to further improve the gas barrier performance under high humidity, the gas barrier performance after a retort treatment, the gas barrier performance in a case of acidic content filling, and the like.

Here, according to the studies by the present inventors, it was found that in a case of using polyamide having hygroscopicity or the like as the base material layer, the gas barrier performance under high humidity, the gas barrier performance after a retort treatment, and the gas barrier performance in a case of acidic content filling, and the like deteriorate. However, by setting (number of moles of polyvalent metal compound in the gas barrier coating material)/(number of moles of —COO— groups included in the polycarboxylic acid in the gas barrier coating material) to be equal to or more than the above lower limit value, even in a case of using polyamide having hygroscopicity or the like as the base material layer, it is possible to improve the gas barrier performance under high humidity, the gas barrier performance after a retort treatment, the gas barrier performance in a case of acidic content filling, and the like.

On the other hand, (number of moles of polyvalent metal compound in the gas barrier coating material)/(number of moles of —COO— groups included in the polycarboxylic acid in the gas barrier coating material) is preferably equal to or less than 0.80, more preferably equal to or less than 0.70, even more preferably equal to or less than 0.60, and still even more preferably equal to or less than 0.50.

By setting (number of moles of polyvalent metal compound in the gas barrier coating material)/(number of moles of —COO— groups included in the polycarboxylic acid in the gas barrier coating material) to be equal to or less than the above upper limit value, it is possible to further improve the gas barrier performance under high humidity, the gas barrier performance after a retort treatment, the gas barrier performance in a case of acidic content filling, and the like.

The carbonic acid-based ammonium salt according to the gas barrier coating material used for the cured product containing the gas barrier film of the second embodiment is added to bring the polyvalent metal compound into the form of a polyvalent metal ammonium carbonate complex to improve the solubility of the polyvalent metal compound and to prepare a uniform solution containing the polyvalent metal compound. When the gas barrier coating material used for the cured product forming the gas barrier film of the second embodiment includes the carbonic acid-based ammonium salt, the amount of the polyvalent metal compound dissolved can be increased, and as a result, even when (number of moles of polyvalent metal compound in the gas barrier coating material)/(number of moles of —COO— groups included in the polycarboxylic acid in the gas barrier coating material) is set to be equal to or more than the above lower limit value, a uniform gas barrier coating material can be obtained.

Examples of the carbonic acid-based ammonium salt include ammonium carbonate, and ammonium hydrogencarbonate, and the like, and ammonium carbonate is preferable from the viewpoint that the component easily volatilizes and does not easily remain in the obtained gas barrier layer.

(Number of moles of carbonic acid-based ammonium salt in the gas barrier coating material)/(number of moles of polyvalent metal compound in the gas barrier coating material) is preferably equal to or more than 0.05, more preferably equal to or more than 0.10, and even more preferably equal to or more than 0.25, still even more preferably equal to or more than 0.50, and particularly preferably equal to or more than 0.75. This makes it possible to further improve the solubility of the polyvalent metal compound.

On the other hand, (number of moles of carbonic acid-based ammonium salt in the gas barrier coating material)/ (number of moles of polyvalent metal compound in the gas barrier coating material) is preferably equal to or less than 10.0, more preferably equal to or less than 5.0, even more preferably equal to or less than 2.0, and still even more preferably equal to or less than 1.5. This makes it possible to further improve the coatability of the gas barrier coating material used for the cured product forming the gas barrier film of the second embodiment.

In addition, from the viewpoint of improving coatability, the solid content concentration of the gas barrier coating material used for the cured product forming the gas barrier film of the second embodiment is preferably set to 0.5 to 15% by mass, and more preferably 1 to 10% by mass.

In addition, it is preferable to further add a surfactant to the gas barrier coating material used for the cured product forming the gas barrier film of the second embodiment from the viewpoint of suppressing the occurrence of cissing when the gas barrier coating material is applied. The addition amount of the surfactant is preferably 0.01 to 3% by mass, and more preferably 0.01 to 1% by mass, based on 100% by mass of the total solid content of the gas barrier coating material.

Examples of the surfactant according to the gas barrier coating material used for the cured product forming the gas barrier film of the second embodiment include an anionic surfactant, a non-ionic surfactant, a cationic surfactant, an amphoteric surfactant and the like, and, from the viewpoint of obtaining good coatability, non-ionic surfactants are preferable, and polyoxyethylene alkyl ethers are more preferable.

Examples of the non-ionic surfactants include polyoxyalkylene alkylaryl ethers, polyoxyalkylene alkyl ethers, polyoxyalkylene fatty acid esters, sorbitan fatty acid esters, silicone-based surfactants, acetylene alcohol-based surfactants, fluorine-containing surfactants, and the like.

Examples of the polyoxyalkylene alkylaryl ethers include polyoxyethylene nonyl phenyl ether, polyoxyethylene octyl phenyl ether, polyoxyethylene dodecyl phenyl ether, and the like.

Examples of the polyoxyalkylene alkyl ethers include polyoxyethylene alkyl ethers such as polyoxyethylene oleyl ether and polyoxyethylene lauryl ether.

Examples of the polyoxyalkylene fatty acid esters include polyoxyethylene oleic acid esters, polyoxyethylene lauric acid esters, polyoxyethylene distearic acid esters, and the like.

Examples of sorbitan fatty acid esters include sorbitan laurate, sorbitan monostearate, sorbitan monooleate, sorbitan sesquioleate, polyoxyethylene monooleate, polyoxyethylene stearate, and the like.

Examples of silicone-based surfactants include dimethylpolysiloxane and the like.

Examples of acetylene alcohol-based surfactants include 2,4,7,9-tetramethyl-5-decyne-4,7-diol, 3,6-dimethyl-4-octyne-3,6-diol, 3,5-dimethyl-1-hexyne-301, and the like.

Examples of fluorine-containing surfactants include fluorine alkyl ester and the like.

The gas barrier coating material used for the cured product forming the gas barrier film of the second embodiment may include other additives as long as the object of the present invention is not impaired. For example, various additives such as lubricants, slip agents, anti-blocking agents, antistatic agents, anti-fogging agents, pigments, dyes, and inorganic or organic fillers may be added.

The gas barrier coating material used for the cured product forming the gas barrier film of the second embodiment can be produced, for example, as follows.

First, the carboxyl groups of the polycarboxylic acid are completely or partially neutralized by adding a volatile base to the polycarboxylic acid. Further, a polyvalent metal salt compound and a carbonic acid-based ammonium salt are mixed, and a metal salt is formed in all or some of the carboxyl groups of the polycarboxylic acid neutralized with the volatile base and the carboxyl groups of the polycarboxylic acid not neutralized with the volatile base described above. Then, 0073 is further obtained. Mixing the polycarboxylic acid, the polyvalent metal salt compound, the carbonic acid-based ammonium salt, and the polyamine compound in such a procedure makes it possible to suppress the generation of agglomerates and to obtain a uniform gas barrier coating material. This makes it possible to more effectively advance the dehydration-condensation reaction between the —COO— group included in the polycarboxylic acid and the amino group included in the polyamine compound.

More details are as follows.

First, a completely or partially neutralized solution of carboxyl groups which form the polycarboxylic acid is prepared.

A volatile base is added to the polycarboxylic acid and the carboxyl groups of the polycarboxylic acid are completely neutralized or partially neutralized. By neutralizing the carboxyl groups of the polycarboxylic acid, gelation which is caused by to the reaction of the carboxyl groups which form the polycarboxylic acid, a polyvalent metal compound, and amino groups which form a polyamine compound when adding the polyvalent metal compound or the polyamine compound is effectively prevented, and it is possible to obtain a uniform gas barrier coating material.

Subsequently, a polyvalent metal salt compound and a carbonic acid-based ammonium salt are added thereto and dissolved and a polyvalent metal salt with —COO— groups which form polycarboxylic acid is formed by the polyvalent metal ions which are produced. At this time, the —COO— groups which form a salt with the polyvalent metal ions refer to both carboxyl groups which are not neutralized with the base and —COO— groups which are neutralized with a base described above. In a case of the —COO— groups which are neutralized with a base, polyvalent metal ions which are derived from the polyvalent metal compound described above are replaced and oriented to form a polyvalent metal salt of a —COO— group. Then, it is possible to obtain a gas barrier coating material by further adding a polyamine compound after forming a polyvalent metal salt.

The gas barrier coating material thus produced is applied onto the base material layer, dried and cured to form a gas barrier layer. At this time, the polyvalent metal of the polyvalent metal salt of the —COO— groups forming the polycarboxylic acid forms metal cross-linking, and amide cross-linking is formed by amino groups which form the polyamine to obtain a gas barrier layer which has excellent gas barrier properties.

The gas barrier film according to the second embodiment is formed of the cured product of the gas barrier coating material used for the cured product forming the gas barrier film of the second embodiment, and is obtained by applying the gas barrier coating material to the base material layer or inorganic material layer, then carrying out drying and a heat treatment, and curing the gas barrier coating material to form a gas barrier layer. That is, the gas barrier film according to the second embodiment is obtained by curing the gas barrier coating material.

Further, in the infrared absorption spectrum of the gas barrier film 10 or the gas barrier layer 103 according to the second embodiment, when the total peak area in a range of an absorption band of equal to or more than 1493 $cm^{-1}$ and equal to or less than 1780 $cm^{-1}$ is set as A, and the total peak area in a range of an absorption band of equal to or more than 1598 $cm^{-1}$ and equal to or less than 1690 $cm^{-1}$ is set as B, the area ratio of the amide bond represented by B/A is preferably equal to or less than 0.380, more preferably equal to or less than 0.370, even more preferably equal to or less than 0.360, and particularly preferably equal to or less than 0.350 from the viewpoint of further improving the balance of barrier properties, delamination resistance, and productivity. Further, the lower limit of the area ratio of the amide bond represented by B/A is preferably equal to or more than 0.235, more preferably equal to or more than 0.250, even more preferably equal to or more than 0.270, still even more preferably equal to or more than 0.290, and particularly preferably equal to or more than 0.310 from the viewpoint of further improving the gas barrier performance under high humidity, the gas barrier performance after a retort treatment, the gas barrier performance in a case of acidic content filling, and the like.

Further, in the infrared absorption spectrum of the gas barrier film 10 or the gas barrier layer 103 according to the second embodiment, when the total peak area in a range of an absorption band of equal to or more than 1690 $cm^{-1}$ and equal to or less than 1780 $cm^{-1}$ is set as C, the area ratio of the carboxylic acid represented by C/A is preferably equal to or less than 0.150, more preferably equal to or less than 0.120, even more preferably equal to or less than 0.100, still even more preferably equal to or less than 0.080, and particularly preferably equal to or less than 0.060 from the viewpoint of further improving the gas barrier performance under high humidity, the gas barrier performance after a retort treatment, the gas barrier performance in a case of acidic content filling, and the like.

The lower limit of the area ratio of the carboxylic acid represented by the above C/A is not particularly limited, and is, for example, equal to or more than 0.0001.

Further, in the infrared absorption spectrum of a gas barrier film 10 or the gas barrier layer 103 according to the second embodiment, when a total peak area in a range of an absorption band of equal to or more than 1493 $cm^{-1}$ and equal to or less than 1598 $cm^{-1}$ is set as D, the area ratio of the carboxylate represented by D/A is preferably equal to or more than 0.520, more preferably equal to or more than 0.550, even more preferably equal to or more than 0.580, and still even more preferably equal to or more than 0.600 from the viewpoint of further improving the balance of barrier properties, delamination resistance, and productivity.

Further, the upper limit of the area ratio of the carboxylate represented by the above D/A is preferably equal to or less than 0.750, more preferably equal to or less than 0.720, even more preferably equal to or less than 0.700, and still even more preferably equal to or less than 0.680 from the viewpoint of further improving the gas barrier performance under high humidity, the gas barrier performance after a retort treatment, the gas barrier performance in a case of acidic content filling, and the like.

In the gas barrier film or the gas barrier layer according to the second embodiment, absorption based on $\nu C=O$ of the unreacted carboxylic acid in the infrared absorption spectrum is observed in the vicinity of 1700 $cm^{-1}$, absorption based on $\nu C=O$ of the amide bond which is a cross-linked structure is observed in the vicinity of 1630 to 1685 $cm^{-1}$, and absorption based on $\nu C=O$ of the carboxylate is observed in the vicinity of 1540 to 1560 $cm^{-1}$.

That is, in the second embodiment, it is considered that, in the infrared absorption spectrum, the total peak area A in a range of an absorption band of equal to or more than 1493 $cm^{-1}$ and equal to or less than 1780 $cm^{-1}$ represents an index of the total amount of carboxylic acid, the amide bond, and the carboxylate, and the total peak area B in a range of an absorption band of equal to or more than 1598 $cm^{-1}$ and equal to or less than 1690 $cm^{-1}$ represents an index of the amount of the amide bond present. Further, it is considered that the total peak area C in a range of an absorption band of equal to or more than 1690 $cm^{-1}$ and equal to or less than 1780 $cm^{-1}$ represents an index of the amount of the unreacted carboxylic acid present and the total peak area D in a range of an absorption band of equal to or more than 1493 $cm^{-1}$ and equal to or less than 1598 $cm^{-1}$ represents an index of the amount of carboxylate present.

Note that in the second embodiment, the total peak areas A to D can be measured by the following procedure.

First, a 1 cm×3 cm measurement sample is cut out from the gas barrier film or the gas barrier layer. Next, the infrared absorption spectrum of the surface of the gas barrier film or the gas barrier layer is obtained by infrared total reflection measurement (ATR method). From the obtained infrared absorption spectrum, the total peak areas A to D described above are calculated by the following procedures (1) to (4).

(1) The absorbances at 1780 $cm^{-1}$ and at 1493 $cm^{-1}$ are connected by a straight line (N), and the area surrounded by the absorption spectrum in the range of an absorption band of equal to or more than 1493 $cm^{-1}$ and equal to or less than 1780 $cm^{-1}$ and N is set as the total peak area A.

(2) A straight line (O) is drawn down orthogonally from an absorbance (Q) at 1690 $cm^{-1}$, an intersection point of N and O is set as P, a straight line (S) is drawn down orthogonally from an absorbance (R) at 1598 $cm^{-1}$, an intersection point of N and S is set as T, and the area which is surrounded by the absorption spectrum in the range of an absorption band of equal to or more than 1598 $cm^{-1}$ and equal to or less than 1690 $cm^{-1}$, the straight line S, the point T, the straight line N, the point P, the straight line O, the absorbance Q, and the absorbance R is set as the total peak area B.

(3) The area which is surrounded by the absorption spectrum in the range of an absorption band of equal to or more than 1690 $cm^{-1}$ and equal to or less than 1780 $cm^{-1}$, the absorbance Q, the straight line O, the point P, and the straight line N is set as the total peak area C.

(4) The area which is surrounded by the absorption spectrum in the range of an absorption band of equal to or more than 1493 $cm^{-1}$ and equal to or less than 1598 $cm^{-1}$, the absorbance R, the straight line S, the point T, and the straight line N is set as the total peak area D.

Next, the area ratios B/A, C/A, and D/A are obtained from the areas obtained by the above method.

Note that, it is possible to perform the measurement of the infrared absorption spectrum of the second embodiment (infrared total reflection measurement: ATR method), for example, under the conditions of an incident angle of 45 degrees, room temperature, a resolution of 4 $cm^{-1}$, and a cumulative number of 100 times by mounting a PKM-GE-S (Germanium) crystal and using an IRT-5200 apparatus manufactured by JASCO Corporation.

It is possible to control the area ratio of the amide bond which is indicated by B/A, the area ratio of the carboxylic acid which is indicated by C/A, and the area ratio of the carboxylate which is indicated by D/A of the gas barrier film or the gas barrier layer according to the second embodiment by appropriately adjusting the manufacturing conditions of the gas barrier film or the gas barrier layer.

In the second embodiment, in particular, the blending ratio of the polycarboxylic acid and the polyamine compound, the method of preparing the gas barrier coating material, the method, temperature, time, and the like of the heat treatment of the gas barrier coating material are examples of factors for controlling the area ratio of the amide bond indicated by B/A, the area ratio of the carboxylic acid indicated by C/A, and the area ratio of the carboxylate indicated by D/A.

Third Embodiment

A gas barrier film according to a third embodiment is formed of a cured product of a mixture including a polycarboxylic acid, a polyamine compound, and a polyvalent metal compound (hereinafter, also referred to as a gas barrier coating material), and (number of moles of polyvalent metal derived from the polyvalent metal compound in the cured product)/(number of moles of —COO— groups derived from the polycarboxylic acid in the cured product) is equal to or more than 0.16.

The gas barrier film according to the third embodiment is obtained by, for example, applying a gas barrier coating material to a base material layer or an inorganic material layer, then carrying out drying and a heat treatment, and curing the gas barrier coating material to form a gas barrier layer. That is, the gas barrier film according to the third embodiment is obtained by curing the gas barrier coating material.

In the third embodiment, (number of moles of polyvalent metal compound in the gas barrier coating material)/(number of moles of —COO— groups included in the polycarboxylic acid in the gas barrier coating material), that is, (number of moles polyvalent metal derived from the polyvalent metal compound in the cured product)/(number of moles of —COO— groups derived from the polycarboxylic acid in the cured product) is preferably equal to or more than 0.18, more preferably equal to or more than 0.20, even more preferably equal to or more than 0.25, still even more preferably equal to or more than 0.30, and still even more preferably equal to or more than 0.35.

By setting (number of moles of polyvalent metal compound in the gas barrier coating material)/(number of moles of —COO— groups included in the polycarboxylic acid in the gas barrier coating material) to be equal to or more than the above lower limit value, it is possible to further improve the gas barrier performance under high humidity, the gas barrier performance after a retort treatment, the gas barrier performance in a case of acidic content filling, and the like.

Here, according to the studies by the present inventors, it was found that in a case of using polyamide having hygroscopicity or the like as the base material layer, the gas barrier performance under high humidity, the gas barrier performance after a retort treatment, and the gas barrier performance in a case of acidic content filling, and the like deteriorate. However, by setting (number of moles of polyvalent metal compound in the gas barrier coating material)/(number of moles of —COO— groups included in the polycarboxylic acid in the gas barrier coating material) to be equal to or more than the above lower limit value, even in a case of using polyamide having hygroscopicity or the like as the base material layer, it is possible to improve the gas barrier performance under high humidity, the gas barrier performance after a retort treatment, the gas barrier performance in a case of acidic content filling, and the like.

On the other hand, (number of moles of polyvalent metal compound in the gas barrier coating material)/(number of moles of —COO— groups included in the polycarboxylic acid in the gas barrier coating material), that is, (number of moles of polyvalent metal derived from the polyvalent metal compound in the cured product)/(number of moles of —COO— groups derived from the polycarboxylic acid in the cured product) is preferably equal to or less than 0.80, more preferably equal to or less than 0.70, even more preferably equal to or less than 0.60, and still even more preferably equal to or less than 0.50.

By setting (number of moles of polyvalent metal compound in the gas barrier coating material)/(number of moles of —COO— groups included in the polycarboxylic acid in the gas barrier coating material) to be equal to or less than the above upper limit value, it is possible to further improve the gas barrier performance under high humidity, the gas barrier performance after a retort treatment, the gas barrier performance in a case of acidic content filling, and the like.

According to the third embodiment, it is possible to obtain a gas barrier film and a gas barrier laminate having excellent barrier properties and delamination resistance even when the heat treatment time is short. That is, according to the third embodiment, it is possible to provide a gas barrier material having an excellent balance of barrier properties, delamination resistance, and productivity.

(Polycarboxylic Acid)

The polycarboxylic acid has two or more carboxyl groups in the molecule. Specific examples thereof include homopolymers of α,β-unsaturated carboxylic acid such as acrylic acid, methacrylic acid, itaconic acid, fumaric acid, crotonic acid, cinnamic acid, 3-hexenoic acid, and 3-hexenedioic acid, or copolymers thereof. In addition, the polycarboxylic acid may be a copolymer of the α,β-unsaturated carboxylic acid described above and esters such as ethyl ester, olefins such as ethylene, or the like.

Among these, a homopolymer of acrylic acid, methacrylic acid, itaconic acid, fumaric acid, crotonic acid, and cinnamic acid or a copolymer thereof is preferable, one type or two or more types of polymers selected from polyacrylic acid, polymethacrylic acid, and a copolymer of acrylic acid and methacrylic acid is more preferable, at least one type of polymer selected from polyacrylic acid and polymethacrylic acid is even more preferable, and at least one type of polymer selected from a homopolymer of acrylic acid or a homopolymer of methacrylic acid is particularly preferable.

Here, in the third embodiment, polyacrylic acid includes both a homopolymer of acrylic acid and a copolymer of acrylic acid and another monomer. Ina case of a copolymer of acrylic acid and another monomer, the polyacrylic acid generally includes constituent units which are derived from acrylic acid at 90% by mass or more, preferably 95% by mass or more, and more preferably 99% by mass or more in 100% by mass of the polymer.

In addition, in the third embodiment, polymethacrylic acid includes both a homopolymer of methacrylic acid and a copolymer of methacrylic acid and another monomer. In a case of a copolymer of methacrylic acid and another monomer, the polymethacrylic acid generally includes constituent units which are derived from methacrylic acid at 90% by mass or more, preferably 95% by mass or more, and more preferably 99% by mass or more in 100% by mass of the polymer.

The polycarboxylic acid according to the third embodiment is a polymer obtained by polymerizing carboxylic acid monomers, and the molecular weight of the polycarboxylic acid is preferably 500 to 2,500,000, more preferably 5,000 to 2,000,000, even more preferably 10,000 to 1,500,000, and still even more preferably 100,000 to 1,200,000 from the viewpoint of excellent balance of gas barrier properties and handleability.

Here, in the third embodiment, the molecular weight of the polycarboxylic acid is the polyethylene oxide conversion weight average molecular weight and is measurable using gel permeation chromatography (GPC).

Here, it is possible to suppress gelation from occurring by neutralizing the polycarboxylic acid with the volatile base according to the third embodiment when mixing a polyvalent metal compound or a polyamine compound and a polycarboxylic acid. Accordingly, in the polycarboxylic acid, from the viewpoint of prevention of gelation, a volatile base is preferably used for the partially neutralized product or completely neutralized product of the carboxyl group. It is possible to obtain the neutralized product by partially or completely neutralizing the carboxyl group of the polycarboxylic acid with a volatile base, (that is, the carboxyl group of the polycarboxylic acid is partially or completely made into carboxylate). Due to this, it is possible to prevent gelation when adding a polyamine compound and a polyvalent metal compound.

A partially neutralized product is prepared by adding a volatile base to an aqueous solution of polycarboxylic acid polymer and it is possible to set a desired neutralization degree by adjusting the ratio of the amounts of the polycarboxylic acid and the volatile base. In the third embodiment, from the viewpoint of sufficiently suppressing gelation caused by the neutralization reaction with the amino group of the polyamine compound, the neutralization degree of the polycarboxylic acid by the volatile base is preferably 70 to 300 equivalent %, more preferably 90 to 250 equivalent %, and even more preferably 100 to 200 equivalent %.

It is possible to use an arbitrary water-soluble base as a volatile base.

Examples of volatile bases include ammonia, morpholine, alkylamine, 2-dimethyl amino ethanol, N-methylmonopholine, ethylene diamine, and tertiary amines such as triethyl amine, an aqueous solution thereof or a mixture thereof. From the viewpoint of obtaining good gas barrier properties, an ammonia aqueous solution is preferable.

(Polyamine Compound)

The gas barrier coating material used for the cured product forming the gas barrier film of the third embodiment includes a polyamine compound. When the gas barrier coating material includes the polyamine compound, the barrier properties of the obtained gas barrier material can be improved, the inter-layer adhesion of the obtained gas barrier laminate can be improved, and the delamination resistance can be improved.

The polyamine compound according to the gas barrier coating material used in the cured product forming the gas barrier film of the third embodiment is a polymer having two or more amino groups at the main chain, side chain, or terminal. Specific examples thereof include aliphatic polyamines such as polyallylamine, polyvinylamine, polyethyleneimine, and poly(trimethyleneimine); polyamides having amino groups on side chains such as polylysine and polyarginine; and the like. In addition, a polyamine where a portion of the amino group is modified may be used. From the viewpoint of obtaining good gas barrier properties, polyethyleneimine is more preferable.

From the viewpoint of excellent balance of gas barrier properties and handleability, the number average molecular weight of the polyamine compound according to the gas barrier coating material used in the cured product forming the gas barrier film of the third embodiment is preferably 50 to 2,000,000, more preferably 100 to 1,000,000, even more preferably 1,500 to 500,000, still even more preferably 1,500 to 100,000, still even more preferably 1,500 to 50,000, still even more preferably 3,500 to 20,000, still even more preferably 5,000 to 15,000, and particularly preferably 7,000 to 12,000.

Here, in the gas barrier coating material used for the cured product forming the gas barrier film of the third embodiment, the molecular weight of the polyamine compound can be measured by using a boiling point increasing method or a viscosity method.

A polyvalent metal compound is a metal and a metal compound which belongs to Group 2 to 13 in the periodic table and, in detail, a divalent or higher valency metal such as magnesium (Mg), calcium (Ca), strontium (Sr), barium (Ba), iron (Fe), cobalt (Co), nickel (Ni), copper (Cu), zinc (Zn), and aluminum (Al), and oxides, hydroxides, halogenides, carbonates, phosphates, phosphites, hypophosphites, sulfates, or sulfites of these metals, or the like. From the point of view of water resistance, impurities, and the like, a metal oxide or a metal hydroxide is preferable.

Among the above divalent or higher valency metals, Mg, Ca, Zn, Ba and Al, and particularly Zn are preferable. Among the above metal compounds, divalent or higher valency metal compounds are preferable, and divalent metal compounds such as magnesium oxide, calcium oxide, barium oxide, zinc oxide, magnesium hydroxide, calcium hydroxide, barium hydroxide, and zinc hydroxide are more preferable, zinc oxide and zinc hydroxide are even more preferable, and zinc oxide is particularly preferable.

Among these polyvalent metal compounds, at least one type of polyvalent metal compound may be used, and one type or two more types thereof may be used.

In the third embodiment, (number of moles of amino groups included in the polyamine compound in the gas barrier coating material)/(number of moles of —COO— groups included in the polycarboxylic acid in the gas barrier coating material), that is, (number of moles of amino groups derived from the polyamine compound in the cured product)/(number of moles of —COO— groups derived from the polycarboxylic acid in the cured product) is preferably equal to or more than 20/100, more preferably equal to or more than 25/100, even more preferably equal to or more than 30/100, still even more preferably equal to or more than 35/100, and particularly preferably equal to or more than 40/100. By setting (number of moles of amino groups included in the polyamine compound in the gas barrier coating material)/(number of moles of —COO— groups included in the polycarboxylic acid in the gas barrier coating material) to be equal to or more than the above lower limit value, it is possible to further improve the gas barrier performance under high humidity, the gas barrier performance after a retort treatment, the gas barrier performance in a case of acidic content filling, and the like.

On the other hand, (number of moles of amino groups included in the polyamine compound in the gas barrier coating material)/(number of moles of —COO— groups included in the polycarboxylic acid in the gas barrier coating material), that is, (number of moles of amino groups derived from the polyamine compound in the cured product)/(number of moles of —COO— groups derived from the polycarboxylic acid in the cured product) is preferably equal to or less than 90/100, more preferably equal to or less than 85/100, even more preferably equal to or less than 80/100, still even more preferably equal to or less than 75/100, and particularly preferably equal to or less than 70/100. By setting (number of moles of amino groups included in the polyamine compound in the gas barrier coating material)/(number of moles of —COO— groups included in the polycarboxylic acid in the gas barrier coating material) to be equal to or less than the above upper limit value, it is possible to further improve the gas barrier performance under high humidity, the gas barrier performance after a retort treatment, the gas barrier performance in a case of acidic content filling, and the like.

Details of the reason are not clear; however, it is considered that it is possible to obtain a gas barrier film or a gas barrier laminate having excellent gas barrier performance under both high humidity, gas barrier performance after a retort treatment, and gas barrier performance in a case of acidic content filling by forming a well-balanced fine structure by amide cross-linking using amino groups which form a polyamine compound and metal cross-linking using polyvalent metals which form a salt of polycarboxylic acid and polyvalent metal.

It is preferable that the gas barrier coating material used for the cured product forming the gas barrier film of the third embodiment further includes a carbonic acid-based ammonium salt. The carbonic acid-based ammonium salt is added to bring the polyvalent metal compound into the form of a polyvalent metal ammonium carbonate complex to improve the solubility of the polyvalent metal compound and to prepare a uniform solution containing the polyvalent metal compound. When the gas barrier coating material used for the cured product forming the gas barrier film of the third embodiment includes the carbonic acid-based ammonium salt, the amount of the polyvalent metal compound dissolved can be increased, and as a result, even when (number of moles of polyvalent metal compound in the gas barrier coating material)/(number of moles of —COO— groups included in the polycarboxylic acid in the gas barrier coating material) is set to be equal to or more than the above lower limit value, a uniform gas barrier coating material can be obtained.

Examples of the carbonic acid-based ammonium salt include ammonium carbonate, and ammonium hydrogencarbonate, and the like, and ammonium carbonate is preferable from the viewpoint that the component easily volatilizes and does not easily remain in the obtained gas barrier layer.

(Number of moles of carbonic acid-based ammonium salt in the gas barrier coating material)/(number of moles of polyvalent metal compound in the gas barrier coating material) is preferably equal to or more than 0.05, more preferably equal to or more than 0.10, and even more preferably equal to or more than 0.25, still even more preferably equal to or more than 0.50, and particularly preferably equal to or more than 0.75. This makes it possible to further improve the solubility of the polyvalent metal compound.

On the other hand, (number of moles of carbonic acid-based ammonium salt in the gas barrier coating material)/(number of moles of polyvalent metal compound in the gas barrier coating material) is preferably equal to or less than 10.0, more preferably equal to or less than 5.0, even more preferably equal to or less than 2.0, and still even more preferably equal to or less than 1.5. Due to this, the coatability of the gas barrier coating material according to the third embodiment can be further improved.

In addition, from the viewpoint of improving coatability, the solid content concentration of the gas barrier coating material is preferably set to 0.5 to 15% by mass, and more preferably 1 to 10% by mass.

In addition, it is preferable to further add a surfactant to the gas barrier coating material from the viewpoint of suppressing the occurrence of cissing when the gas barrier coating material is applied. The addition amount of the surfactant is preferably 0.01 to 3% by mass, and more preferably 0.01 to 1% by mass, based on 100% by mass of the total solid content of the gas barrier coating material.

Examples of the surfactant according to the gas barrier coating material used for the cured product forming the gas barrier film of the third embodiment include an anionic surfactant, a non-ionic surfactant, a cationic surfactant, an amphoteric surfactant and the like, and, from the viewpoint of obtaining good coatability, non-ionic surfactants are preferable, and polyoxyethylene alkyl ethers are more preferable.

Examples of the non-ionic surfactants include polyoxyalkylene alkylaryl ethers, polyoxyalkylene alkyl ethers, polyoxyalkylene fatty acid esters, sorbitan fatty acid esters, silicone-based surfactants, acetylene alcohol-based surfactants, fluorine-containing surfactants, and the like.

Examples of the polyoxyalkylene alkylaryl ethers include polyoxyethylene nonyl phenyl ether, polyoxyethylene octyl phenyl ether, polyoxyethylene dodecyl phenyl ether, and the like.

Examples of the polyoxyalkylene alkyl ethers include polyoxyethylene alkyl ethers such as polyoxyethylene oleyl ether and polyoxyethylene lauryl ether.

Examples of the polyoxyalkylene fatty acid esters include polyoxyethylene oleic acid esters, polyoxyethylene lauric acid esters, polyoxyethylene distearic acid esters, and the like.

Examples of sorbitan fatty acid esters include sorbitan laurate, sorbitan monostearate, sorbitan monooleate, sorbitan sesquioleate, polyoxyethylene monooleate, polyoxyethylene stearate, and the like.

Examples of silicone-based surfactants include dimethylpolysiloxane and the like.

Examples of acetylene alcohol-based surfactants include 2,4,7,9-tetramethyl-5-decyne-4,7-diol, 3,6-dimethyl-4-octyne-3,6-diol, 3,5-dimethyl-1-hexyne-3ol, and the like.

Examples of fluorine-containing surfactants include fluorine alkyl ester and the like.

The gas barrier coating material used for the cured product forming the gas barrier film of the third embodiment may include other additives as long as the object of the present invention is not impaired. For example, various additives such as lubricants, slip agents, anti-blocking agents, antistatic agents, anti-fogging agents, pigments, dyes, and inorganic or organic fillers may be added.

The gas barrier coating material used for the cured product forming the gas barrier film of the third embodiment can be produced, for example, as follows.

First, the carboxyl groups of the polycarboxylic acid are completely or partially neutralized by adding a volatile base to the polycarboxylic acid. Further, a polyvalent metal salt compound and a carbonic acid-based ammonium salt are mixed, and a metal salt is formed in all or some of the carboxyl groups of the polycarboxylic acid neutralized with the volatile base and the carboxyl groups of the polycarboxylic acid not neutralized with the volatile base described above. Then, a polyamine compound is further added thereto to obtain a gas barrier coating material. Mixing the polycarboxylic acid, the polyvalent metal salt compound, the carbonic acid-based ammonium salt, and the polyamine compound in such a procedure makes it possible to suppress the generation of agglomerates and to obtain a uniform gas barrier coating material. This makes it possible to more effectively advance the dehydration-condensation reaction between the —COO— group included in the polycarboxylic acid and the amino group included in the polyamine compound.

More details are as follows.

First, a completely or partially neutralized solution of carboxyl groups which form the polycarboxylic acid is prepared.

A volatile base is added to the polycarboxylic acid and the carboxyl groups of the polycarboxylic acid are completely neutralized or partially neutralized. By neutralizing the carboxyl groups of the polycarboxylic acid, gelation which is caused by to the reaction of the carboxyl groups which form the polycarboxylic acid, a polyvalent metal compound, and amino groups which form a polyamine compound when adding the polyvalent metal compound or the polyamine compound is effectively prevented, and it is possible to obtain a uniform gas barrier coating material.

Subsequently, a polyvalent metal salt compound and a carbonic acid-based ammonium salt are added thereto and dissolved and a polyvalent metal salt with —COO— groups which form polycarboxylic acid is formed by the polyvalent metal ions which are produced. At this time, the —COO— groups which form a salt with the polyvalent metal ions refer to both carboxyl groups which are not neutralized with the base and —COO— groups which are neutralized with a base described above. Ina case of the —COO— groups which are neutralized with a base, polyvalent metal ions which are derived from the polyvalent metal compound described above are replaced and oriented to form a polyvalent metal salt of a —COO— group. Then, it is possible to obtain a gas barrier coating material by further adding a polyamine compound after forming a polyvalent metal salt.

The gas barrier coating material thus produced is applied onto the base material layer, dried and cured to form a gas barrier layer. At this time, the polyvalent metal of the polyvalent metal salt of the —COO— groups forming the polycarboxylic acid forms metal cross-linking, and amide cross-linking is formed by amino groups which form the polyamine to obtain a gas barrier layer which has excellent gas barrier properties.

Further, in the infrared absorption spectrum of the gas barrier film 10 or the gas barrier layer 103 according to the third embodiment, when the total peak area in a range of an absorption band of equal to or more than 1493 cm$^{-1}$ and equal to or less than 1780 cm$^{-1}$ is set as A, and the total peak area in a range of an absorption band of equal to or more than 1598 cm$^{-1}$ and equal to or less than 1690 cm$^{-1}$ is set as B, the area ratio of the amide bond represented by B/A is preferably equal to or less than 0.380, more preferably equal to or less than 0.370, even more preferably equal to or less than 0.360, and particularly preferably equal to or less than 0.350 from the viewpoint of further improving the balance of barrier properties, delamination resistance, and productivity. Further, the lower limit of the area ratio of the amide bond represented by B/A is preferably equal to or more than 0.235, more preferably equal to or more than 0.250, even more preferably equal to or more than 0.270, still even more preferably equal to or more than 0.290, and particularly preferably equal to or more than 0.310 from the viewpoint of further improving the gas barrier performance under high humidity, the gas barrier performance after a retort treatment, the gas barrier performance in a case of acidic content filling, and the like.

Further, in the infrared absorption spectrum of the gas barrier film 10 or the gas barrier layer 103 according to the third embodiment, when the total peak area in a range of an absorption band of equal to or more than 1690 cm$^{-1}$ and equal to or less than 1780 cm$^{-1}$ is set as C, the area ratio of the carboxylic acid represented by C/A is preferably equal to or less than 0.150, more preferably equal to or less than 0.120, even more preferably equal to or less than 0.100, still even more preferably equal to or less than 0.080, and particularly preferably equal to or less than 0.060 from the viewpoint of further improving the gas barrier performance under high humidity, the gas barrier performance after a retort treatment, the gas barrier performance in a case of acidic content filling, and the like.

The lower limit of the area ratio of the carboxylic acid represented by the above C/A is not particularly limited, and is, for example, equal to or more than 0.0001.

Further, in the infrared absorption spectrum of a gas barrier film 10 or the gas barrier layer 103 according to the third embodiment, when a total peak area in a range of an absorption band of equal to or more than 1493 cm$^{-1}$ and equal to or less than 1598 cm$^{-1}$ is set as D, the area ratio of the carboxylate represented by D/A is preferably equal to or more than 0.520, more preferably equal to or more than 0.550, even more preferably equal to or more than 0.580, and still even more preferably equal to or more than 0.600 from the viewpoint of further improving the balance of barrier properties, delamination resistance, and productivity.

Further, the upper limit of the area ratio of the carboxylate represented by the above D/A is preferably equal to or less than 0.750, more preferably equal to or less than 0.720, even more preferably equal to or less than 0.700, and still even more preferably equal to or less than 0.680 from the viewpoint of further improving the gas barrier performance under high humidity, the gas barrier performance after a retort treatment, the gas barrier performance in a case of acidic content filling, and the like.

In the gas barrier film or the gas barrier layer according to the third embodiment, absorption based on $\nu C=O$ of the unreacted carboxylic acid in the infrared absorption spectrum is observed in the vicinity of 1700 $cm^{-1}$, absorption based on $\nu C=O$ of the amide bond which is a cross-linked structure is observed in the vicinity of 1630 to 1685 $cm^{-1}$, and absorption based on $\nu C=O$ of the carboxylate is observed in the vicinity of 1540 to 1560 $cm^{-1}$.

That is, in the third embodiment, it is considered that, in the infrared absorption spectrum, the total peak area A in a range of an absorption band of equal to or more than 1493 $cm^{-1}$ and equal to or less than 1780 $cm^{-1}$ represents an index of the total amount of carboxylic acid, the amide bond, and the carboxylate, and the total peak area B in a range of an absorption band of equal to or more than 1598 $cm^{-1}$ and equal to or less than 1690 $cm^{-1}$ represents an index of the amount of the amide bond present. Further, it is considered that the total peak area C in a range of an absorption band of equal to or more than 1690 $cm^{-1}$ and equal to or less than 1780 $cm^{-1}$ represents an index of the amount of the unreacted carboxylic acid present and the total peak area D in a range of an absorption band of equal to or more than 1493 $cm^{-1}$ and equal to or less than 1598 $cm^{-1}$ represents an index of the amount of carboxylate present.

Note that in the third embodiment, the total peak areas A to D can be measured by the following procedure.

First, a 1 cm×3 cm measurement sample is cut out from the gas barrier film or the gas barrier layer. Next, the infrared absorption spectrum of the surface of the gas barrier film or the gas barrier layer is obtained by infrared total reflection measurement (ATR method). From the obtained infrared absorption spectrum, the total peak areas A to D described above are calculated by the following procedures (1) to (4).

(1) The absorbances at 1780 $cm^{-1}$ and at 1493 $cm^{-1}$ are connected by a straight line (N), and the area surrounded by the absorption spectrum in the range of an absorption band of equal to or more than 1493 $cm^{-1}$ and equal to or less than 1780 $cm^{-1}$ and N is set as the total peak area A.

(2) A straight line (O) is drawn down orthogonally from an absorbance (Q) at 1690 $cm^{-1}$, an intersection point of N and O is set as P, a straight line (S) is drawn down orthogonally from an absorbance (R) at 1598 $cm^{-1}$, an intersection point of N and S is set as T, and the area which is surrounded by the absorption spectrum in the range of an absorption band of equal to or more than 1598 $cm^{-1}$ and equal to or less than 1690 $cm^{-1}$, the straight line S, the point T, the straight line N, the point P, the straight line O, the absorbance Q, and the absorbance R is set as the total peak area B.

(3) The area which is surrounded by the absorption spectrum in the range of an absorption band of equal to or more than 1690 $cm^{-1}$ and equal to or less than 1780 $cm^{-1}$, the absorbance Q, the straight line O, the point P, and the straight line N is set as the total peak area C.

(4) The area which is surrounded by the absorption spectrum in the range of an absorption band of equal to or more than 1493 $cm^{-1}$ and equal to or less than 1598 $cm^{-1}$, the absorbance R, the straight line S, the point T, and the straight line N is set as the total peak area D.

Next, the area ratios B/A, C/A, and D/A are obtained from the areas obtained by the above method.

Note that, it is possible to perform the measurement of the infrared absorption spectrum of the third embodiment (infrared total reflection measurement: ATR method), for example, under the conditions of an incident angle of 45 degrees, room temperature, a resolution of 4 $cm^{-1}$, and a cumulative number of 100 times by mounting a PKM-GE-S (Germanium) crystal and using an IRT-5200 apparatus manufactured by JASCO Corporation.

It is possible to control the area ratio of the amide bond which is indicated by B/A, the area ratio of the carboxylic acid which is indicated by C/A, and the area ratio of the carboxylate which is indicated by D/A of the gas barrier film or the gas barrier layer according to the third embodiment by appropriately adjusting the manufacturing conditions of the gas barrier film or the gas barrier layer.

In the third embodiment, in particular, the blending ratio of the polycarboxylic acid and the polyamine compound, the method of preparing the gas barrier coating material, the method, temperature, time, and the like of the heat treatment of the gas barrier coating material are examples of factors for controlling the area ratio of the amide bond indicated by B/A, the area ratio of the carboxylic acid indicated by C/A, and the area ratio of the carboxylate indicated by D/A.

<Gas Barrier Coating Material>

A gas barrier film formed of a cured product of a gas barrier coating material according to a second embodiment includes a partially neutralized product or a completely neutralized product of a polycarboxylic acid and a volatile base, a polyamine compound, a polyvalent metal compound, and a carbonic acid-based ammonium salt.

According to the gas barrier coating material used for the cured product forming the gas barrier film of the second embodiment, a gas barrier film and a gas barrier laminate having excellent barrier properties and delamination resistance can be obtained even when the heat treatment time is short. That is, according to the gas barrier coating material used for the cured product forming the gas barrier film of the second embodiment, it is possible to provide a gas barrier material having an excellent balance of barrier properties, delamination resistance, and productivity.

(Polycarboxylic Acid)

The polycarboxylic acid has two or more carboxyl groups in the molecule. Specific examples thereof include homopolymers of α,β-unsaturated carboxylic acid such as acrylic acid, methacrylic acid, itaconic acid, fumaric acid, crotonic acid, cinnamic acid, 3-hexenoic acid, and 3-hexenedioic acid, or copolymers thereof. In addition, the polycarboxylic acid may be a copolymer of the α,β-unsaturated carboxylic acid described above and esters such as ethyl ester, olefins such as ethylene, or the like.

Among these, a homopolymer of acrylic acid, methacrylic acid, itaconic acid, fumaric acid, crotonic acid, and cinnamic acid or a copolymer thereof is preferable, one type or two or more types of polymers selected from polyacrylic acid, polymethacrylic acid, and a copolymer of acrylic acid and methacrylic acid is more preferable, at least one type of polymer selected from polyacrylic acid and polymethacrylic acid is even more preferable, and at least one type of polymer selected from a homopolymer of acrylic acid or a homopolymer of methacrylic acid is particularly preferable.

Here, in the gas barrier coating material used for the cured product forming the gas barrier film according to the second embodiment, the polyacrylic acid includes both a homopolymer of acrylic acid and a copolymer of acrylic acid and another monomer. In a case of a copolymer of acrylic acid and another monomer, the polyacrylic acid generally includes constituent units which are derived from acrylic acid at 90% by mass or more, preferably 95% by mass or more, and more preferably 99% by mass or more in 100% by mass of the polymer.

Further, in the gas barrier coating material used for the cured product forming the gas barrier film of the second embodiment, polymethacrylic acid includes both a homopolymer of methacrylic acid and a copolymer of methacrylic acid and another monomer. In a case of a copolymer of methacrylic acid and another monomer, the polymethacrylic acid generally includes constituent units which are derived from methacrylic acid at 90% by mass or more, preferably 95% by mass or more, and more preferably 99% by mass or more in 100% by mass of the polymer.

The polycarboxylic acid according to in the gas barrier coating material used for the cured product forming the gas barrier film of the second embodiment is a polymer obtained by polymerizing carboxylic acid monomers, and the molecular weight of the polycarboxylic acid is preferably 500 to 2,500,000, more preferably 5,000 to 2,000,000, even more preferably 10,000 to 1,500,000, and still even more preferably 100,000 to 1,200,000 from the viewpoint of excellent balance of gas barrier properties and handleability.

Here, in the gas barrier coating material used for the cured product forming the gas barrier film of the second embodiment, the molecular weight of the polycarboxylic acid is the polyethylene oxide conversion weight average molecular weight and is measurable using gel permeation chromatography (GPC).

It is possible to suppress gelation from occurring by neutralizing the polycarboxylic acid with the volatile base according to the gas barrier coating material used for the cured product forming the gas barrier film of the second embodiment when mixing a polyvalent metal compound or a polyamine compound and polycarboxylic acid. Accordingly, in the polycarboxylic acid, from the viewpoint of prevention of gelation, a volatile base is preferably used for the partially neutralized product or completely neutralized product of the carboxyl group. It is possible to obtain the neutralized product by partially or completely neutralizing the carboxyl group of the polycarboxylic acid with a volatile base, (that is, the carboxyl group of the polycarboxylic acid is partially or completely made into carboxylate). Due to this, it is possible to prevent gelation when adding a polyamine compound and a polyvalent metal compound.

A partially neutralized product is prepared by adding a volatile base to an aqueous solution of polycarboxylic acid polymer and it is possible to set a desired neutralization degree by adjusting the ratio of the amounts of the polycarboxylic acid and the volatile base. In the gas barrier coating material used for the cured product forming the gas barrier film of the second embodiment, from the viewpoint of sufficiently suppressing gelation caused by the neutralization reaction with the amino group of the polyamine compound, the neutralization degree of the polycarboxylic acid by the volatile base is preferably 70 to 300 equivalent %, more preferably 90 to 250 equivalent %, and even more preferably 100 to 200 equivalent %.

It is possible to use an arbitrary water-soluble base as a volatile base.

Examples of volatile bases include ammonia, morpholine, alkylamine, 2-dimethyl amino ethanol, N-methylmonopholine, ethylene diamine, and tertiary amines such as triethyl amine, an aqueous solution thereof or a mixture thereof. From the viewpoint of obtaining good gas barrier properties, an ammonia aqueous solution is preferable.

(Polyamine Compound)

The gas barrier coating material used for the cured product forming the gas barrier film of the second embodiment includes a polyamine compound. When the gas barrier coating material includes the polyamine compound, the barrier properties of the obtained gas barrier material can be improved, the inter-layer adhesion of the obtained gas barrier laminate can be improved, and the delamination resistance can be improved.

The polyamine compound according to the gas barrier coating material used for the cured product forming the gas barrier film of the second embodiment is a polymer having two or more amino groups at the main chain, side chain or terminal. Specific examples thereof include aliphatic polyamines such as polyallylamine, polyvinylamine, polyethyleneimine, and poly(trimethyleneimine); polyamides having amino groups onside chains such as polylysine and polyarginine; and the like. In addition, a polyamine where a portion of the amino group is modified may be used. From the viewpoint of obtaining good gas barrier properties, polyethyleneimine is more preferable.

From the viewpoint of excellent balance of gas barrier properties and handleability, the number average molecular weight of the polyamine compound according to the gas barrier coating material used in the cured product forming the gas barrier film of the second embodiment is preferably 50 to 2,000,000, more preferably 100 to 1,000,000, even more preferably 1,500 to 500,000, still even more preferably 1,500 to 100,000, still even more preferably 1,500 to 50,000, still even more preferably 3,500 to 20,000, still even more preferably 5,000 to 15,000, and particularly preferably 7,000 to 12,000.

Here, in the gas barrier coating material used for the cured product forming the gas barrier film of the second embodiment, the molecular weight of the polyamine compound can be measured by using a boiling point increasing method or a viscosity method.

A polyvalent metal compound is a metal and a metal compound which belongs to Group 2 to 13 in the periodic table and, in detail, a divalent or higher valency metal such as magnesium (Mg), calcium (Ca), strontium (Sr), barium (Ba), iron (Fe), cobalt (Co), nickel (Ni), copper (Cu), zinc (Zn), and aluminum (Al), and oxides, hydroxides, halogenides, carbonates, phosphates, phosphites, hypophosphites, sulfates, or sulfites of these metals, or the like. From the point of view of water resistance, impurities, and the like, a metal oxide or a metal hydroxide is preferable.

Among the above divalent or higher valency metals, Mg, Ca, Zn, Ba and Al, and particularly Zn are preferable. Among the above metal compounds, divalent or higher valency metal compounds are preferable, and divalent metal compounds such as magnesium oxide, calcium oxide, barium oxide, zinc oxide, magnesium hydroxide, calcium hydroxide, barium hydroxide, and zinc hydroxide are more preferable, zinc oxide and zinc hydroxide are even more preferable, and zinc oxide is particularly preferable.

Among these polyvalent metal compounds, at least one type of polyvalent metal compound may be used, and one type or two more types thereof may be used.

In the gas barrier coating material used for the cured product forming the gas barrier film of the second embodiment, (number of moles of amino groups included in the polyamine compound in the gas barrier coating material)/(number of moles of —COO— groups included in the polycarboxylic acid in the gas barrier coating material) is preferably equal to or more than 20/100, more preferably equal to or more than 25/100, even more preferably equal to or more than 30/100, still even more preferably equal to or more than 35/100, and particularly preferably equal to or more than 40/100. By setting (number of moles of amino groups included in the polyamine compound in the gas barrier coating material)/(number of moles of —COO— groups included in the polycarboxylic acid in the gas barrier coating material) to be equal to or more than the above lower limit value, it is possible to further improve the gas barrier performance under high humidity, the gas barrier performance after a retort treatment, the gas barrier performance in a case of acidic content filling, and the like.

On the other hand, (number of moles of amino groups included in the polyamine compound in the gas barrier coating material)/(number of moles of —COO— groups included in the polycarboxylic acid in the gas barrier coating material) is preferably equal to or less than 90/100, more preferably equal to or less than 85/100, even more preferably equal to or less than 80/100, still even more preferably equal to or less than 75/100, and particularly preferably equal to or less than 70/100. By setting (number of moles of amino groups included in the polyamine compound in the gas barrier coating material)/(number of moles of —COO— groups included in the polycarboxylic acid in the gas barrier coating material) to be equal to or less than the above upper limit value, it is possible to further improve the gas barrier performance under high humidity, the gas barrier performance after a retort treatment, the gas barrier performance in a case of acidic content filling, and the like.

Details of the reason are not clear; however, it is considered that it is possible to obtain a gas barrier film or a gas barrier laminate having excellent gas barrier performance under both high humidity, gas barrier performance after a retort treatment, and gas barrier performance in a case of acidic content filling by forming a well-balanced fine structure by amide cross-linking using amino groups which form a polyamine compound and metal cross-linking using polyvalent metals which form a salt of polycarboxylic acid and polyvalent metal.

Further, in the gas barrier coating material used for the cured product forming the gas barrier film of the second embodiment, (number of moles of polyvalent metal compound in the gas barrier coating material)/(number of moles of —COO— groups included in the polycarboxylic acid in the gas barrier coating material) is preferably equal to or more than 0.16, more preferably equal to or more than 0.18, even more preferably equal to or more than 0.20, still even more preferably equal to or more than 0.25, still even more preferably equal to or more than 0.30, and still even more preferably equal to or more than 0.35.

By setting (number of moles of polyvalent metal compound in the gas barrier coating material)/(number of moles of —COO— groups included in the polycarboxylic acid in the gas barrier coating material) to be equal to or more than the above lower limit value, it is possible to further improve the gas barrier performance under high humidity, the gas barrier performance after a retort treatment, the gas barrier performance in a case of acidic content filling, and the like.

Here, according to the studies by the present inventors, it was found that in a case of using polyamide having hygroscopicity or the like as the base material layer, the gas barrier performance under high humidity, the gas barrier performance after a retort treatment, and the gas barrier performance in a case of acidic content filling, and the like deteriorate. However, by setting (number of moles of polyvalent metal compound in the gas barrier coating material)/(number of moles of —COO— groups included in the polycarboxylic acid in the gas barrier coating material) to be equal to or more than the above lower limit value, even in a case of using polyamide having hygroscopicity or the like as the base material layer, it is possible to improve the gas barrier performance under high humidity, the gas barrier performance after a retort treatment, the gas barrier performance in a case of acidic content filling, and the like.

On the other hand, (number of moles of polyvalent metal compound in the gas barrier coating material)/(number of moles of —COO— groups included in the polycarboxylic acid in the gas barrier coating material) is preferably equal to or less than 0.80, more preferably equal to or less than 0.70, even more preferably equal to or less than 0.60, and still even more preferably equal to or less than 0.50.

By setting (number of moles of polyvalent metal compound in the gas barrier coating material)/(number of moles of —COO— groups included in the polycarboxylic acid in the gas barrier coating material) to be equal to or less than the above upper limit value, it is possible to further improve the gas barrier performance under high humidity, the gas barrier performance after a retort treatment, the gas barrier performance in a case of acidic content filling, and the like.

The carbonic acid-based ammonium salt according to the gas barrier coating material used for the cured product containing the gas barrier film of the second embodiment is added to bring the polyvalent metal compound into the form of a polyvalent metal ammonium carbonate complex to improve the solubility of the polyvalent metal compound and to prepare a uniform solution containing the polyvalent metal compound. When the gas barrier coating material according to the second embodiment includes the carbonic acid-based ammonium salt, the amount of the polyvalent metal compound dissolved can be increased, and as a result, even when (number of moles of polyvalent metal compound in the gas barrier coating material)/(number of moles of —COO— groups included in the polycarboxylic acid in the gas barrier coating material) is set to be equal to or more than the above lower limit value, a uniform gas barrier coating material can be obtained.

Examples of the carbonic acid-based ammonium salt include ammonium carbonate, and ammonium hydrogencarbonate, and the like, and ammonium carbonate is preferable from the viewpoint that the component easily volatilizes and does not easily remain in the obtained gas barrier layer.

(Number of moles of carbonic acid-based ammonium salt in the gas barrier coating material)/(number of moles of polyvalent metal compound in the gas barrier coating material) is preferably equal to or more than 0.05, more preferably equal to or more than 0.10, and even more preferably equal to or more than 0.25, still even more preferably equal to or more than 0.50, and particularly preferably equal to or more than 0.75. This makes it possible to further improve the solubility of the polyvalent metal compound.

On the other hand, (number of moles of carbonic acid-based ammonium salt in the gas barrier coating material)/(number of moles of polyvalent metal compound in the gas barrier coating material) is preferably equal to or less than 10.0, more preferably equal to or less than 5.0, even more preferably equal to or less than 2.0, and still even more preferably equal to or less than 1.5. Due to this, the coatability of the gas barrier coating material according to the second embodiment can be further improved.

In addition, from the viewpoint of improving coatability, the solid content concentration of the gas barrier coating material is preferably set to 0.5 to 15% by mass, and more preferably 1 to 10% by mass.

In addition, it is preferable to further add a surfactant to the gas barrier coating material from the viewpoint of suppressing the occurrence of cissing when the gas barrier coating material is applied. The addition amount of the surfactant is preferably 0.01 to 3% by mass, and more preferably 0.01 to 1% by mass, based on 100% by mass of the total solid content of the gas barrier coating material.

Examples of the surfactant according to the gas barrier coating material used for the cured product forming the gas barrier film of the second embodiment include an anionic surfactant, a non-ionic surfactant, a cationic surfactant, an amphoteric surfactant and the like, and, from the viewpoint of obtaining good coatability, non-ionic surfactants are preferable, and polyoxyethylene alkyl ethers are more preferable.

Examples of the non-ionic surfactants include polyoxyalkylene alkylaryl ethers, polyoxyalkylene alkyl ethers, polyoxyalkylene fatty acid esters, sorbitan fatty acid esters, silicone-based surfactants, acetylene alcohol-based surfactants, fluorine-containing surfactants, and the like.

Examples of the polyoxyalkylene alkylaryl ethers include polyoxyethylene nonyl phenyl ether, polyoxyethylene octyl phenyl ether, polyoxyethylene dodecyl phenyl ether, and the like.

Examples of the polyoxyalkylene alkyl ethers include polyoxyethylene alkyl ethers such as polyoxyethylene oleyl ether and polyoxyethylene lauryl ether.

Examples of the polyoxyalkylene fatty acid esters include polyoxyethylene oleic acid esters, polyoxyethylene lauric acid esters, polyoxyethylene distearic acid esters, and the like.

Examples of sorbitan fatty acid esters include sorbitan laurate, sorbitan monostearate, sorbitan monooleate, sorbitan sesquioleate, polyoxyethylene monooleate, polyoxyethylene stearate, and the like.

Examples of silicone-based surfactants include dimethylpolysiloxane and the like.

Examples of acetylene alcohol-based surfactants include 2,4,7,9-tetramethyl-5-decyne-4,7-diol, 3,6-dimethyl-4-octyne-3,6-diol, 3,5-dimethyl-1-hexyne-301, and the like.

Examples of fluorine-containing surfactants include fluorine alkyl ester and the like.

The gas barrier coating material used for the cured product forming the gas barrier film of the second embodiment may include other additives as long as the object of the present invention is not impaired. For example, various additives such as lubricants, slip agents, anti-blocking agents, antistatic agents, anti-fogging agents, pigments, dyes, and inorganic or organic fillers may be added.

<Method for Producing Gas Barrier Coating Material>

The gas barrier coating material used for the cured product forming the gas barrier film of the second embodiment can be produced, for example, as follows.

First, the carboxyl groups of the polycarboxylic acid are completely or partially neutralized by adding a volatile base to the polycarboxylic acid. Further, a polyvalent metal salt compound and a carbonic acid-based ammonium salt are mixed, and a metal salt is formed in all or some of the carboxyl groups of the polycarboxylic acid neutralized with the volatile base and the carboxyl groups of the polycarboxylic acid not neutralized with the volatile base described above. Then, a polyamine compound is further added thereto to obtain a gas barrier coating material. Mixing the polycarboxylic acid, the polyvalent metal salt compound, the carbonic acid-based ammonium salt, and the polyamine compound in such a procedure makes it possible to suppress the generation of agglomerates and to obtain a uniform gas barrier coating material. This makes it possible to more effectively advance the dehydration-condensation reaction between the —COO— group included in the polycarboxylic acid and the amino group included in the polyamine compound.

More details are as follows.

First, a completely or partially neutralized solution of carboxyl groups which form the polycarboxylic acid is prepared.

A volatile base is added to the polycarboxylic acid and the carboxyl groups of the polycarboxylic acid are completely neutralized or partially neutralized. By neutralizing the carboxyl groups of the polycarboxylic acid, gelation which is caused by to the reaction of the carboxyl groups which form the polycarboxylic acid, a polyvalent metal compound, and amino groups which form a polyamine compound when adding the polyvalent metal compound or the polyamine compound is effectively prevented, and it is possible to obtain a uniform gas barrier coating material.

Subsequently, a polyvalent metal salt compound and a carbonic acid-based ammonium salt are added thereto and dissolved and a polyvalent metal salt with —COO— groups which form polycarboxylic acid is formed by the polyvalent metal ions which are produced. At this time, the —COO— groups which form a salt with the polyvalent metal ions refer to both carboxyl groups which are not neutralized with the base and —COO— groups which are neutralized with a base described above. Ina case of the —COO— groups which are neutralized with a base, polyvalent metal ions which are derived from the polyvalent metal compound described above are replaced and oriented to form a polyvalent metal salt of a —COO— group. Then, it is possible to obtain a gas barrier coating material by further adding a polyamine compound after forming a polyvalent metal salt.

The gas barrier coating material thus produced is applied onto the base material layer, dried and cured to forma gas barrier layer. At this time, the polyvalent metal of the polyvalent metal salt of the —COO— groups forming the polycarboxylic acid forms metal cross-linking, and amide cross-linking is formed by amino groups which form the polyamine to obtain a gas barrier layer which has excellent gas barrier properties.

<Gas Barrier Laminate>

FIGS. 1 and 2 are cross-sectional views schematically showing an example of a structure of a gas barrier laminate 100 including a gas barrier layer formed of the gas barrier film according to at least any one of the first to third embodiments.

The gas barrier laminate 100 including a gas barrier layer formed of the gas barrier film according to at least any one of the first to third embodiments has a gas barrier layer 103 formed by applying the gas barrier coating material according to at least any one of the first to third embodiments onto the base material layer 101, and carrying out curing.

That is, the gas barrier laminate 100 including the gas barrier layer formed of the gas barrier film according to at least any one of the first to third embodiments includes the base material layer 101, and the gas barrier layer 103 that is provided on at least one surface of the base material layer 101 and is formed of the gas barrier film 10 according to at least any one of the first to third embodiments.

In addition, as shown in FIG. 2, in the gas barrier laminate 100, an inorganic material layer 102 may be further laminated between the base material layer 101 and the gas barrier layer 103 (gas barrier film 10). Due to this, it is possible to further improve the barrier performances such as the oxygen barrier properties and water vapor barrier properties.

In addition, in the gas barrier laminate 100, an undercoat layer may be further laminated on the base material layer 101 from the viewpoint of improving adhesion between the base material layer 101 and the gas barrier layer 103 or the inorganic material layer 102.

(Inorganic Material Layer)

Examples of the inorganic material which forms the inorganic material layer 102 according to the gas barrier laminate including the gas barrier layer formed of the gas barrier film according to at least any one of the first to third embodiments include metals, metal oxides, metal nitrides, metal fluorides, metal oxynitrides, and the like which are able to form a thin film having barrier properties.

Examples of inorganic materials forming the inorganic material layer 102 include one type or two or more types selected from periodic table 2A elements such as beryllium, magnesium, calcium, strontium, and barium, periodic table transition elements such as titanium, zirconium, ruthenium, hafnium, and tantalum; periodic table 2B elements such as zinc; periodic table 3A elements such as aluminum, gallium, indium, and thallium; periodic table 4A elements such as silicon, germanium, and tin; periodic table 6A elements such as selenium and tellurium, and the like, and oxides, nitrides, fluorides, oxynitrides, and the like thereof.

Note that the group name of the periodic table is indicated by the old CAS formula.

Furthermore, among the inorganic materials described above, one type or two or more types of inorganic materials selected from the group consisting of silicon oxide, aluminum oxide, and aluminum is preferable, and aluminum oxide is more preferable due to being excellent in the balance of barrier properties, cost, and the like.

Note that, silicon oxide may contain silicon monoxide and silicon suboxide in addition to silicon dioxide.

The inorganic material layer 102 is formed of the inorganic material described above. The inorganic material layer 102 may be formed of a single inorganic material layer or a plurality of inorganic material layers. In addition, in a case where the inorganic material layer 102 is formed of a plurality of inorganic material layers, the inorganic material layer may be formed of the same type of inorganic material layer or may be formed of different types of inorganic material layers.

The thickness of the inorganic material layer 102 is usually equal to or more than 1 nm and equal to or less than 1000 nm, and preferably equal to or more than 1 nm and equal to or less than 500 nm, from the viewpoint of balance of the barrier properties, adhesion, handleability, and the like.

In the gas barrier laminate including the gas barrier layer formed of the gas barrier film according to at least any one of the first to third embodiments, the thickness of the inorganic material layer 102 can be obtained from an image observed by a transmission electron microscope or a scanning electron microscope.

The method of forming the inorganic material layer 102 is not particularly limited and t is possible to form the inorganic material layer 102 on one side or both sides of the base material layer 101 using, for example, a vacuum deposition method, an ion plating method, a sputtering method, a chemical vapor deposition method, a physical vapor deposition method, a chemical vapor deposition method (CVD method), a plasma CVD method, a sol-gel method, or the like. Among the above, film formation under reduced pressure such as a sputtering method, an ion plating method, a chemical vapor deposition method (CVD), a physical vapor deposition method (PVD), a plasma CVD method, or the like is desirable. Due to this, it is expected quickly reacting the chemically active molecular species containing silicon such as silicon nitride or silicon oxynitride will make it possible to improve the smoothness of the surface of the inorganic material layer 102 and to reduce the number of pores.

In order to rapidly perform these bonding reactions, it is desirable that the inorganic atoms and compounds are chemically active molecular species or atomic species.

(Base Material Layer)

Regarding the base material layer 101 according to the gas barrier laminate including the gas barrier layer formed of the gas barrier film according to at least any one of the first to third embodiments, any material can be used without particular limitation as long as a solution of the gas barrier coating material can be applied. Examples thereof include organic materials such as a thermosetting resin, a thermoplastic resin, or paper, inorganic materials such as glass, potter, ceramic, silicon oxide, silicon oxynitride, silicon nitride, and cement, and metals such as aluminum, aluminum oxide, iron, copper, and stainless steel, a base material layer with a multilayer structure which is formed of a combination of organic materials or of organic materials and inorganic materials, and the like. Among these, for example, in a case of various types of film uses such as packaging material or panels, a plastic film using a thermosetting resin and a thermoplastic resin or an organic material such as paper is preferable.

As the thermosetting resin, a known thermosetting resin can be used. Examples of the thermosetting resin include known thermosetting resins such as epoxy resins, unsaturated polyester resins, phenolic resins, urea-melamine resins, polyurethane resins, silicone resins, and polyimides, and the like.

As the thermoplastic resin, a known thermoplastic resin can be used. Examples of thermoplastic resins include polyolefins (polyethylene, polypropylene, poly(4-methyl-1-pentene), poly(1-butene), and the like), polyesters (polyethylene terephthalate, polybutylene terephthalate, polyethylene naphthalate, and the like), polyamide (nylon-6, nylon-66, polymetaxylene adipamide, and the like), polyvinyl chloride, polyimide, ethylene vinyl acetate copolymer or saponified products thereof, polyvinyl alcohol, polyacrylonitrile, polycarbonate, polystyrene, ionomers, fluorine-based resins, or mixtures thereof.

Among these, from the viewpoint of good transparency, one type or two or more types of resins selected from the group consisting of polypropylene, polyethylene terephthalate, polyethylene naphthalate, polyamide, polyimide, and polybutylene terephthalate are preferable, and from the viewpoint of excellent pinhole resistance, tear resistance, heat resistance, and the like, one type or two or more types of resins selected from the group consisting of polyamide, polyethylene terephthalate, polybutylene terephthalate are preferable. In addition, in a case of using polyamide having hygroscopicity as the base material layer, in the gas barrier laminate, the polyamide absorbs moisture and swells, the gas barrier performance under high humidity, the gas barrier performance after a retort treatment, the gas barrier performance in a case of acidic content filling, and the like easily deteriorate. However, in the gas barrier laminate 100 including the gas barrier layer formed of the gas barrier film according to at least any one of the first to third embodiments, even in the case of using the polyamide hygroscopicity as the base material layer 101, it is possible to suppress deterioration in the gas barrier performance under high humidity and the gas barrier performance after a retort treatment.

In addition, the base material layer 101 formed of the thermoplastic resin may be a single layer or two or more layers, depending on the application of the gas barrier laminate 100.

In addition, the film formed by the above thermosetting resin and thermoplastic resin may be stretched in at least one direction, preferably in a biaxial direction, to form the base material layer.

From the viewpoint of excellent transparency, rigidity, and heat resistance, the base material layer 101 according to the gas barrier laminate including the gas barrier layer formed of the gas barrier film according to at least any one of the first to third embodiments is preferably a biaxial stretched film formed of one type or two or more types of thermoplastic resins selected from polypropylene, polyethylene terephthalate, polyethylene naphthalate, polyamide, polyimide, and polybutylene terephthalate, and more preferably a biaxial stretched film formed of one type or two or more types of thermoplastic resins selected from polyamide, polyethylene terephthalate, and polybutylene terephthalate.

In the gas barrier laminate 100 including the gas barrier layer formed of the gas barrier film according to at least any one of the first to third embodiments, the base material layer 101 includes a first base material layer and a second base material layer. In a case where the gas barrier layer 103, the first base material layer, and the second base material layer are laminated in this order, the first base material layer preferably includes one type or two or more types of resins selected from the group consisting of polyamide, polyethylene terephthalate and polybutylene terephthalate, and more preferably includes polyamide. In this case, it is preferable that the base material layer 101 includes a polyolefin having excellent water resistance (polyethylene, polypropylene, poly(4-methyl-1-pentene), poly(1-butene), or the like).

As a result, in the gas barrier laminate 100 including the gas barrier layer formed of the gas barrier film according to at least any one of the first to third embodiments, while improving pinhole resistance, tear resistance, heat resistance, and the like are improved, it is possible to further suppress the deterioration of the gas barrier performance under high humidity and the gas barrier performance after the retort treatment.

In addition, the surface of the base material layer 101 may be coated with polyvinylidene chloride, polyvinyl alcohol, ethylene/vinyl alcohol copolymer, acrylic resin, urethane-based resin, or the like.

Further, the base material layer 101 may be subjected to a surface treatment in order to improve the adhesion with the gas barrier layer 103 (gas barrier film 10). Specifically, a surface activation treatment such as a corona treatment, a flame treatment, a plasma treatment, or a primer coat treatment may be performed.

From the viewpoint of obtaining good film properties, the thickness of the base material layer 101 is preferably 1 to 1000 μm, 1 to 500 μm is more preferable, and 1 to 300 μm is even more preferable.

The shape of the base material layer 101 is not particularly limited and examples thereof include a sheet or film shape, a tray, a cup, a hollow body, or the like.

(Undercoat Layer)

In the gas barrier laminate 100, from the viewpoint of improving the adhesion between the base material layer 101 and the gas barrier layer 103 or the inorganic material layer 102, an undercoat layer, preferably an undercoat layer of an epoxy (meth)acrylate-based compound or a urethane (meth)acrylate-based compound, is preferably formed on the surface of the base material layer 101.

The undercoat layer is preferably a layer obtained by curing at least one type selected from an epoxy (meth)acrylate-based compound and a urethane (meth)acrylate-based compound.

Examples of the epoxy (meth)acrylate-based compound include compounds obtained by reacting epoxy compounds such as bisphenol A type epoxy compounds, bisphenol F type epoxy compounds, bisphenol S type epoxy compounds, phenol novolak type epoxy compounds, cresol novolak type epoxy compounds, and aliphatic epoxy compounds, with acrylic acid or methacrylic acid, and examples thereof include an acid-modified epoxy (meth)acrylate obtained by reacting the epoxy compound above with a carboxylic acid or an anhydride thereof. These epoxy(meth)acrylate-based compounds are coated on the surface of the base material layer together with a photopolymerization initiator and, if necessary, another photopolymerization initiator or a diluent formed of a thermally reactive monomer, after which an undercoat layer is formed by a cross-linking reaction through irradiation with ultraviolet light or the like.

Examples of the urethane (meth)acrylate-based compound include compounds obtained by acrylating an oligomer (also referred to below as a polyurethane-based oligomer) formed of a polyol compound and a polyisocyanate compound, and the like.

It is possible to obtain the polyurethane-based oligomer from a condensation product of a polyisocyanate compound and a polyol compound. Specific examples of the polyisocyanate compound include methylene·bis (p-phenylene diisocyanate), an adduct of hexamethylene diisocyanate·hexanetriol, hexamethylene diisocyanate, tolylene diisocyanate, an adduct of tolylene diisocyanate trimethylolpropane, 1,5-naphthylene diisocyanate, thiopropyl diisocyanate, ethylbenzene-2,4-diisocyanate, 2,4-tolylene diisocyanate dimer, hydrogenated xylylene diisocyanate, tris (4-phenylisocyanate) thiophosphate, and the like, in addition, specific polyol compounds include polyether-based polyols such as polyoxytetramethylene glycol, polyester-based polyols such as polyadipate polyols and polycarbonate polyol, copolymers of acrylate esters and hydroxyethyl methacrylate, and the like. Examples of the monomer forming the acrylate include monomers such as methyl (meth)acrylate, ethyl (meth)acrylate, butyl (meth)acrylate, 2-ethylhexyl (meth)acrylate, methoxyethyl (meth)acrylate, butoxyethyl (meth)acrylate, phenyl (meth)acrylate, and the like.

These epoxy(meth)acrylate-based compounds and urethane (meth)acrylate-based compounds are used in combination, if necessary. In addition, examples of methods of polymerizing the above include various known methods, specifically, methods of irradiation with energy rays including ionizing radiation, heating, or the like.

In the case where the undercoat layer is formed by curing with ultraviolet rays, acetophenones, benzophenones, Michler's benzoyl benzoate, α-amyloxime ester, thioxanthones, or the like are preferably used as a photopolymerization initiator and, in addition, n-butylamine, triethylamine, tri n-butylphosphine, and the like are preferably mixed and used as a photosensitizer. In addition, in the gas barrier laminate including the gas barrier layer formed of the gas barrier film according to at least one of the first to third embodiments, epoxy(meth)acrylate-based compounds and urethane (meth)acrylate-based compounds may be used in combination.

In addition, these epoxy(meth)acrylate-based compounds and urethane (meth)acrylate-based compounds are diluted with (meth)acrylic-based monomers. Examples of such (meth)acrylic-based monomers include methyl (meth)acrylate, ethyl (meth)acrylate, butyl (meth)acrylate, 2-ethylhexyl (meth)acrylate, methoxyethyl (meth)acrylate, butoxyethyl (meth)acrylate, phenyl (meth)acrylate, and, as multi-functional monomers, trimethylolpropane tri(meth)acrylate, hexanediol (meth)acrylate, tripropylene glycol di(meth)acrylate, diethylene glycol di(meth)acrylate, pentaerythritol tri(meth)acrylate, dipentaerythritol hexa(meth)acrylate, 1,6-hexanediol di(meth)acrylate, neopentyl glycol di(meth)acrylate, and the like.

Among the above, in a case where the urethane (meth)acrylate-based compound is used as the undercoat layer, the oxygen gas barrier properties of the obtained gas barrier laminate 100 are further improved.

The thickness of the undercoat layer of the gas barrier laminate including the gas barrier layer formed of the gas barrier films according to at least one of the first to third embodiments is usually in a range of 0.01 to 100 $g/m^2$ and preferably in a range of 0.05 to 50 $g/m^2$ as the coating amount.

(Adhesive Layer)

Further, an adhesive layer may be provided between the base material layer 101 and the gas barrier layer 103 (gas barrier film 10). Note that, the undercoat layer is excluded from the adhesive layer.

The adhesive layer is a layer including any known adhesive agent. Examples of the adhesive agent include laminated adhesive agents formed of an organic titanium-based resin, a polyethylene imine-based resin, a urethane-based resin, an epoxy-based resin, an acrylic-based resin, a polyester-based resin, an oxazoline group containing resin, a modified silicone resin, an alkyl titanate, a polyester-based polybutadiene, and the like, or a one-component type or two-component type polyols and polyvalent isocyanates, aqueous urethane, ionomers, and the like. Alternatively, an aqueous adhesive agent mainly composed of an acrylic-based resin, a vinyl acetate-based resin, a urethane-based resin, a polyester resin, or the like may be used.

In addition, other additives such as a curing agent and a silane coupling agent may be added to the adhesive agent depending on the application of the gas barrier laminate 100. In a case where the gas barrier laminate is used for hot water treatment such as retorting, from the viewpoint of heat resistance and water resistance, a dry lamination adhesive agent represented by a polyurethane-based adhesive agent is preferable, and a solvent-based two-component curing type polyurethane-based adhesive agent is more preferable.

The gas barrier laminate 100 and the gas barrier film 10 including the gas barrier layer formed of the gas barrier film according to at least any one of the first to third embodiments have excellent gas barrier performance, and can be suitably used as a packaging material, in particular, as a food packaging material for contents requiring a high gas barrier performance, as well as various other packaging materials such as medical applications, industrial applications, and daily necessities.

In addition, the gas barrier laminate 100 and the gas barrier film 10 including the gas barrier layer formed of the gas barrier film according to at least any one of the first to third embodiments can be suitably used, for example, as a film for vacuum insulation; a sealing film for sealing electroluminescence devices, solar cells, or the like, for which a high barrier performance is required.

<Method for Producing Gas Barrier Laminate>

A method for producing the gas barrier laminate 100 including the gas barrier layer formed of the gas barrier film according to at least any one of the first to third embodiments includes a step of applying the gas barrier coating material used for the cured product which forms the gas barrier film according to at least any one of the first to third embodiments to the base material layer 101 and then drying the gas barrier coating material to obtain a coating layer, and a step of heating the coating layer and allowing a carboxyl group included in the polycarboxylic acid and an amino group included in the polyamine compound to undergo a dehydration-condensation reaction to form a gas barrier layer 103 having an amide bond.

The method of applying the gas barrier coating material used for the cured product forming the gas barrier film according to at least any one of the first to third embodiments to the base material layer 101 is not particularly limited, and it is possible to use a general method. Examples thereof include methods for coating using various known coating machines such as Mayer bar coaters, air knife coaters, gravure coaters such as direct gravure coaters, gravure offset, arc gravure coaters, gravure reverse and jet nozzle method coaters, reverse roll coaters such as top feed reverse coaters, bottom feed reverse coaters, and nozzle feed reverse coaters, five roll coaters, lip coaters, bar coaters, bar reverse coaters, die coaters, and applicators.

The coating amount (wet thickness) is preferably 0.05 to 300 μm, more preferably 1 to 200 μm, and even more preferably 1 to 100 μm.

When the coating amount is equal to or less than the above upper limit value, it is possible to suppress curling of the obtained gas barrier laminate or gas barrier film. In addition, when the coating amount is equal to or less than the above upper limit value, it is possible to effectively advance the dehydration-condensation reaction between the —COO— group included in the polycarboxylic acid and the amino group included in the polyamine compound.

Further, when the coating amount is equal to or more than the above lower limit value, the barrier performance of the obtained gas barrier laminate or gas barrier film can be improved.

The thickness of the layer including the gas barrier polymer after drying and curing (the gas barrier layer in the gas barrier laminate or the gas barrier film) is preferably equal to or more than 0.01 μm and equal to or less than 15 μm, more preferably equal to or more than 0.05 μm and equal to or less than 5 μm, and even more preferably equal to or more than 0.1 μm and equal to or less than 1 μm.

Regarding the drying and heat treatment, the heat treatment may be carried out after drying, or the drying and the heat treatment may be carried out at the same time.

The method of carrying out the drying and the heat treatment is not particularly limited as long as the object of the present invention can be achieved, as long as it is possible to achieve the object of the present invention and any method capable of curing the gas barrier coating material and heating the cured gas barrier coating material may be used. Examples thereof include heating by convection heat transfer such as ovens or dryers, heating by conductive heat transfer such as heating rolls, heating by radiation heat transfer using electromagnetic waves such as infrared, far infrared, and near infrared heaters, and heating by internal heat generation such as microwaves. As an apparatus used for drying and heat treatment, an apparatus capable of performing both drying and heat treatments is preferable from the viewpoint of production efficiency. In particular, from the viewpoint of being usable for various purposes such as drying, heating, and annealing, it is preferable to use a hot air oven, and from the viewpoint of excellent thermal conductivity efficiency to the film, it is preferable to use a heating roll. Further, methods used for the drying and heat treatments may be appropriately combined. A hot air oven and a heating roll may be used in combination, for example, when the gas barrier coating material is dried in a hot air oven and then subjected to a heat treatment with a heating roll, the heat treatment step time becomes short, which is preferable from the viewpoint of production efficiency. In addition, it is preferable to perform the drying and heat treatment only with a hot air oven.

For example, it is desirable to carry out a heat treatment under conditions where the heat treatment temperature is 160° C. to 250° C. and the heat treatment time is 1 second to 1 minute, preferably where the heat treatment temperature is 180° C. to 240° C. and the heat treatment time is 1 second to 30 seconds, more preferably where the heat treatment temperature is 200° C. to 230° C. and the heat treatment time is 1 second to 15 seconds, and even more preferably where the heat treatment temperature is 200° C. to 220° C. and the heat treatment time is 1 second to 10 seconds. Furthermore, as described above, it is possible to perform the heat treatment in a short time by using a heating roll therewith. Note that, from the viewpoint of effectively advancing the dehydration-condensation reaction between the —COO— group included in the polycarboxylic acid and the amino group included in the polyamine compound, it is important to adjust the heat treatment temperature and the heat treatment time according to the wet thickness of the gas barrier coating material.

Regarding the gas barrier coating material, by reacting carboxyl groups of polycarboxylic acid with polyamine or a polyvalent metal compound by carrying out drying and a heat treatment and carrying out covalent bonding and ion cross-linking, it is possible to obtain a favorable gas barrier property even under high humidity.

Although the embodiments of the present invention were described with reference to the drawings, these are examples of the present invention, and it is also possible to adopt various configurations other than those described above.

EXAMPLES

Hereinafter, the first to third embodiments will be described in detail with reference to Examples and Comparative Examples. The first to third embodiments are not at all limited to the descriptions in these examples.

Example 1

(1) Preparation of Gas Barrier Coating Material

An ammonium polyacrylate aqueous solution having a concentration of 7.29% by mass was obtained by adding ammonia of a 10% ammonia solution (manufactured by Wako Pure Chemical Industries, Ltd.) so as to be 150 equivalent % with respect to the carboxyl groups of the polyacrylic acid (trade name: AC-10H, manufactured by Toagosei Co., Ltd., weight average molecular weight: 800,000), and further adding purified water thereto.

Next, zinc oxide (manufactured by Kanto Chemical Co., Inc.) and ammonium carbonate were added to the obtained ammonium polyacrylate aqueous solution, and the materials were mixed and stirred to prepare a mixed solution (A). Here, the amount of zinc oxide added was set so that (number of moles of zinc oxide in the gas barrier coating material)/(number of moles of —COO— groups included in the polyacrylic acid in the gas barrier coating material) became the value shown Table 1. In addition, the amount of ammonium carbonate was set so that (number of moles of carbonic acid-based ammonium salt in the gas barrier coating material)/(number of moles of zinc oxide in the gas barrier coating material) became 1.0.

Next, a 10% solution of a polyethyleneimine aqueous solution was obtained by adding purified water to polyethyleneimine (trade name: SP-200, manufactured by Nippon Shokubai Co., Ltd., number average molecular weight: 10,000).

Next, the mixed solution (A) and the polyethyleneimine aqueous solution were mixed at such a ratio that (number of moles of amino groups included in the polyethyleneimine in the gas barrier coating material)/(number of moles of —COO— groups included in the polyacrylic acid in the gas barrier coating material) became the value shown in Table 1 to prepare a mixed solution (B).

Further, purified water was added such that the solid content concentration of the mixed solution (B) became 1.5% and stirred until the solution became uniform and then, an activator (trade name: EMULGEN 120, manufactured by Kao Corporation) was mixed therein so as to be 0.3% by weight with respect to the solid content of the mixed solution (B) to prepare a gas barrier coating material.

(2) Preparation of Gas Barrier Laminate Film

The obtained gas barrier coating material was applied to a corona-treated surface of a biaxially stretched polyethylene terephthalate film (PET 12, manufactured by Unitika Ltd.) having a thickness of 12 μm using a Mayer bar such that the coating amount after drying was 0.3 μm, the result was dried under conditions of a temperature of 120° C. for a time of 12 seconds using a hot air dryer and further subjected to a heat treatment at a temperature of 210° C. for a time of 4.2 seconds using a heating roll to obtain a gas barrier laminate film.

The obtained gas barrier laminate film was evaluated as follows, and the results are shown in Table 1.

Examples 2 to 10

Gas barrier laminate films were respectively obtained in the same manner as in Example 1 except that (number of moles of zinc oxide in the gas barrier coating material)/(number of moles of —COO— groups included in the polyacrylic acid in the gas barrier coating material) and (number of moles of amino groups included in the polyethyleneimine in the gas barrier coating material)/(number of moles of —COO— groups included in the polyacrylic acid in the gas barrier coating material) were changed to the values shown in Table 1, respectively.

The obtained gas barrier films were evaluated as follows, and the results are shown in Table 1.

Comparative Examples 1 and 4 to 6

Gas barrier laminate films were respectively obtained in the same manner as in Example 1 except that (number of moles of amino groups included in the polyethyleneimine in the gas barrier coating material)/(number of moles of —COO— groups included in the polyacrylic acid in the gas barrier coating material) was changed to the values shown in Table 1, respectively, and further zinc oxide and ammonium carbonate were not used.

The obtained gas barrier films were evaluated as follows, and the results are shown in Table 1.

Comparative Examples 2 to 3

Gas barrier laminate films were respectively obtained in the same manner as in Example 1 except that (number of moles of zinc oxide in the gas barrier coating material)/(number of moles of —COO— groups included in the polyacrylic acid in the gas barrier coating material) and (number of moles of amino groups included in the polyethyleneimine in the gas barrier coating material)/(number of moles of —COO— groups included in the polyacrylic acid in the gas barrier coating material) were changed to the values shown in Table 1, respectively, and further, ammonium carbonate was not used.

The obtained gas barrier films were evaluated as follows, and the results are shown in Table 1.

Comparative Examples 7 to 9

Gas barrier laminate films were respectively obtained in the same manner as in Example 1 except that (number of moles of zinc oxide in the gas barrier coating material)/(number of moles of —COO— groups included in the polyacrylic acid in the gas barrier coating material) was changed to the values shown in Table 1, respectively, and further, polyethyleneimine was not used.

The obtained gas barrier laminate films were evaluated as follows, and the results are shown in Table 1.

<Evaluation Method>

(1) An ester-based adhesive (9 parts by mass a polyurethane-based adhesive (trade name: Takelac A525S, manufactured by Mitsui Chemicals, Inc.), 1 part by mass of an isocyanate-based curing agent (trade name: Takenate A50, manufactured by Mitsui Chemicals, Inc.), and 7.5 parts by mass of ethyl acetate) were applied to both surfaces of a polyamide film having a thickness of 15 μm (trade name: ONBC, manufactured by Unitika Ltd.). Next, the barrier surface of each of the gas barrier laminate films (the surface to which the gas barrier coating material was applied) obtained in the Examples and Comparative Examples, and an unstretched polypropylene film (trade name: RXC-22, manufactured by Mitsui Chemicals, Tohcello Inc.) having a thickness of 60 μm were attached to each of both surfaces of the polyamide film, to which the adhesive was applied, to obtain a film before a retort treatment.

(2) Retort Treatment (Water Filling)

The obtained film before a retort treatment was folded back such that the unstretched polypropylene film became the inner surface and the two sides were heat sealed to form a bag shape, then 70 cc of water was added thereto as the content and the other side was heat sealed to form a bag, which was subjected to a retort treatment under conditions of 130° C. for 30 minutes in a high temperature and high-pressure retort sterilizer. After the retort treatment, the water content was drained to obtain a film after the retort treatment (water filling).

Note that the films of Comparative Examples 7 and 8 were delaminated by the retort treatment.

(3) Retort Treatment (Grain Vinegar Filling)

The obtained film before a retort treatment was folded back such that the unstretched polypropylene film became the inner surface and the two sides were heat sealed to form a bag shape, then 70 cc of grain vinegar (pH: 2.4) was added thereto as the content and the other side was heat sealed to form a bag, which was subjected to a retort treatment under conditions of 130° C. for 30 minutes in a high temperature and high-pressure retort sterilizer. After the retort treatment, the grain vinegar content was drained, and a film after the retort treatment (grain vinegar filling) was obtained.

(4) Oxygen Permeability [ml/(m$^2$·Day·MPa)]

The oxygen permeability of the film before the retort treatment, the film after the retort treatment (water filling), and the film after the retort treatment (grain vinegar filling) obtained by the above methods was measured by using OX-TRAN2/21 manufactured by Mocon Inc. in accordance with JIS K 7126 under the conditions of a temperature of 20° C. and a humidity of 90% RH.

(5) Water Vapor Permeability [g/(m$^2$·Day)]

The film before the retort treatment, the film after the retort treatment (water filling), and the film after the retort treatment (grain vinegar filling) obtained by the above methods were overlapped such that the unstretched polypropylene film was on the inner surface, the gas barrier laminate film was folded back, the three sides were heat sealed and formed into a bag shape, and then calcium chloride was added as the content and the other side was heat sealed to form a bag with a surface area of 0.01 m$^2$, the bag was left to stand for 300 hours under conditions of 40° C. and 90% RH, and the water vapor permeability was measured by the difference in weight.

(6) IR Area Ratio

Measurement of the infrared absorption spectrum (infrared total reflection measurement: ATR method) was carried out under conditions of an incident angle of 45 degrees, room temperature, a resolution of 4 cm$^{-1}$, and a cumulative number of 100 times by mounting a PKM-GE-S (Germanium) crystal and using an IRT-5200 apparatus manufactured by JASCO Corporation. The obtained absorption spectrum was analyzed using the method described above, and the total peak areas A to D were calculated. Then, the area ratios B/A, C/A, and D/A were obtained from the total peak areas A to D.

(7) Tape Peeling Test

The obtained gas barrier laminate film was subjected to the following tape peeling test and evaluated according to the following criteria.

Cellophane tape (Cello Tape (registered trademark), manufactured by Nichiban Co., Ltd.) was attached to the surface of the gas barrier layer of the prepared gas barrier laminate film, and the cellophane tape was peeled off to evaluate the appearance of peeling of the gas barrier layer.

○: There is no peeling of the gas barrier layer.

x: There is peeling of the gas barrier layer.

(8) Appearance Evaluation of Gas Barrier Laminate Film

The appearance of the gas barrier laminate film was visually evaluated according to the following criteria.

○: No coloring or lumps are observed on the surface.

x: Coloring and lumps are observed on the surface.

TABLE 1

| | (Number of moles of amino groups included in polyethyleneimine)/ (number of moles of —COO— groups included in polyacrylic acid) | (Number of moles of zinc oxide)/ (number of moles of —COO— groups included in polyacrylic acid) | IR area ratio (B/A) [—] | IR area ratio (C/A) [—] | IR area ratio (D/A) [—] | Appearance of film | Tape peeling |
|---|---|---|---|---|---|---|---|
| Comparative Example 1 | 55/100 | — | 0.316 | 0.314 | 0.370 | ○ | ○ |
| Comparative Example 2 | 55/100 | 5/100 | 0.323 | 0.237 | 0.440 | ○ | ○ |
| Comparative Example 3 | 55/100 | 10/100 | 0.325 | 0.174 | 0.501 | ○ | ○ |
| Example 1 | 55/100 | 20/100 | 0.324 | 0.047 | 0.629 | ○ | ○ |
| Example 2 | 55/100 | 30/100 | 0.323 | 0.011 | 0.666 | ○ | ○ |
| Example 3 | 55/100 | 40/100 | 0.329 | 0.001 | 0.670 | ○ | ○ |
| Example 4 | 35/100 | 30/100 | 0.318 | 0.063 | 0.619 | ○ | ○ |
| Example 5 | 35/100 | 40/100 | 0.330 | 0.035 | 0.635 | ○ | ○ |
| Comparative Example 4 | 45/100 | — | 0.334 | 0.303 | 0.362 | ○ | ○ |
| Example 6 | 45/100 | 20/100 | 0.336 | 0.081 | 0.583 | ○ | ○ |
| Example 7 | 45/100 | 30/100 | 0.321 | 0.012 | 0.668 | ○ | ○ |
| Example 8 | 45/100 | 40/100 | 0.325 | 0.004 | 0.671 | ○ | ○ |
| Comparative Example 5 | 65/100 | — | 0.318 | 0.176 | 0.505 | ○ | ○ |
| Example 9 | 65/100 | 30/100 | 0.342 | 0.007 | 0.651 | ○ | ○ |
| Comparative Example 6 | 75/100 | — | 0.321 | 0.142 | 0.537 | ○ | ○ |
| Example 10 | 75/100 | 30/100 | 0.350 | 0.000 | 0.674 | ○ | ○ |
| Comparative Example 7 | 0/100 | 20/100 | 0.234 | 0.180 | 0.585 | ○ | ○ |
| Comparative Example 8 | 0/100 | 40/100 | 0.209 | 0.047 | 0.758 | ○ | ○ |
| Comparative Example 9 | 0/100 | 60/100 | 0.173 | 0.005 | 0.832 | x | x |

| | Barrier property evaluation | | | | | |
|---|---|---|---|---|---|---|
| | Before retort treatment | | After retort treatment (water filling) | | After retort treatment (grain vinegar filling) | |
| | Oxygen permeability ml/m²/d/MPa | Water vapor permeability g/m²/d | Oxygen permeability ml/m²/d/MPa | Water vapor permeability g/m²/d | Oxygen permeability ml/m²/d/MPa | Water vapor permeability g/m²/d |
| Comparative Example 1 | 120 | 5.5 | 543 | 5.5 | — | — |
| Comparative Example 2 | 100 | 5.5 | 474 | 5.5 | 462 | 5.5 |
| Comparative Example 3 | 15 | 5.5 | 480 | 5.5 | 450 | 5.5 |
| Example 1 | 11 | 5.5 | 279 | 5.5 | 262 | 5.5 |
| Example 2 | 10 | 5.5 | 58 | 5.5 | 72 | 5.5 |
| Example 3 | 8 | 5.5 | 16 | 5.5 | 18 | 5.5 |
| Example 4 | — | — | 57 | 5.5 | — | — |
| Example 5 | — | — | 13 | 5.5 | — | — |
| Comparative Example 4 | 110 | 5.5 | 464 | 5.5 | 449 | 5.5 |
| Example 6 | 8 | 5.5 | 226 | 5.5 | 210 | 5.5 |
| Example 7 | 8 | 5.5 | 51 | 5.5 | 55 | 5.5 |
| Example 8 | 4 | 5.5 | 12 | 5.5 | 18 | 5.5 |
| Comparative Example 5 | 185 | 5.5 | 444 | 5.5 | 463 | 5.5 |
| Example 9 | 10 | 5.5 | 81 | 5.5 | 89 | 5.5 |
| Comparative Example 6 | — | — | 463 | 5.5 | — | — |
| Example 10 | — | — | 120 | 5.5 | — | — |
| Comparative Example 7 | — | — | Delamination | Delamination | — | — |
| Comparative Example 8 | — | — | Delamination | Delamination | — | — |
| Comparative Example 9 | — | — | 82 | 5.5 | — | — |

Hereinafter, reference examples will be added.

A1. A gas barrier film formed of a cured product of a mixture including a polycarboxylic acid, a polyamine compound, and a polyvalent metal compound,
in which in an infrared absorption spectrum of the gas barrier film,
when a total peak area in a range of an absorption band of equal to or more than 1493 $cm^{-1}$ and equal to or less than 1780 $cm^{-1}$ is set as A,
a total peak area in a range of an absorption band of equal to or more than 1598 $cm^{-1}$ and equal to or less than 1690 $cm^{-1}$ is set as B,
a total peak area in a range of an absorption band of equal to or more than 1690 $cm^{-1}$ and equal to or less than 1780 $cm^{-1}$ is set as C, and
a total peak area in a range of an absorption band of equal to or more than 1493 $cm^{-1}$ and equal to or less than 1598 $cm^{-1}$ is set as D,
an area ratio of an amide bond represented by B/A is equal to or less than 0.380,
an area ratio of a carboxylic acid represented by C/A is equal to or less than 0.150, and
an area ratio of carboxylate represented by D/A is equal to or more than 0.520.

A2. The gas barrier film according to A1.,
in which (number of moles of polyvalent metal derived from the polyvalent metal compound in the cured product)/(number of moles of —COO— groups derived from the polycarboxylic acid in the cured product) is equal to or more than 0.16.

A3. The gas barrier film according to A1. or A2.,
in which (number of moles of amino groups derived from the polyamine compound in the cured product)/(number of moles of —COO— groups derived from the polycarboxylic acid in the cured product) is equal to or more than 20/100 and equal to or less than 90/100.

A4. The gas barrier film according to any one of A1. to A3.,
in which the polycarboxylic acid includes one type or two or more types of polymers selected from the group consisting of polyacrylic acid, polymethacrylic acid, and a copolymer of acrylic acid and methacrylic acid.

A5. The gas barrier film according to any one of A1. to A4.,
in which the polyvalent metal compound includes a divalent or higher valency metal compound.

A6. The gas barrier film according to any one of A1. to A5.,
in which the polyvalent metal compound includes one type or two or more types of divalent metal compounds selected from magnesium oxide, calcium oxide, barium oxide, zinc oxide, magnesium hydroxide, calcium hydroxide, barium hydroxide, and zinc hydroxide.

A7. The gas barrier film according to any one of A1. to A6.,
in which the polyamine compound includes polyethyleneimine.

A8. A gas barrier laminate including:
a base material layer, and
a gas barrier layer that is provided on at least one surface of the base material layer and is formed of the gas barrier film according to any one of A1. to A7.

A9. The gas barrier laminate according to A8.,
in which the base material layer includes one type or two or more types of resins selected from the group consisting of polyamide, polyethylene terephthalate, and polybutylene terephthalate.

A10. The gas barrier laminate according to A8. or A9.,
in which the base material layer includes a first base material layer, and a second base material layer,
the gas barrier layer, the first base material layer, and the second base material layer are laminated in this order, and
the first base material layer includes one type or two or more types of resins selected from the group consisting of polyamide, polyethylene terephthalate, and polybutylene terephthalate.

A11. The gas barrier laminate according to any one of A8. to A10.,
in which a thickness of the gas barrier layer is equal to or more than 0.01 µm and equal to or less than 15 µm.

A12. The gas barrier laminate according to any one of A8. to A11., further including:
an inorganic material layer provided between the base material layer and the gas barrier layer.

A13. The gas barrier laminate according to A12.,
in which the inorganic material layer is formed of one type or two or more types of inorganic materials selected from the group consisting of silicon oxide, aluminum oxide, and aluminum.

A14. The gas barrier laminate according to A12. or A13.,
in which the inorganic material layer includes an aluminum oxide layer formed of aluminum oxide.

B1. A gas barrier coating material including:
a partially neutralized product or a completely neutralized product of a polycarboxylic acid and a volatile base;
a polyamine compound;
a polyvalent metal compound; and
a carbonic acid-based ammonium salt.

B2. The gas barrier coating material according to B1.,
in which the gas barrier coating material is capable of forming a gas barrier layer by being applied onto a base material layer, dried, and cured.

B3. The gas barrier coating material according to B1. or B2.,
in which (number of moles of the polyvalent metal compound in the gas barrier coating material)/(number of moles of —COO— groups included in the polycarboxylic acid in the gas barrier coating material) is equal to or more than 0.16.

B4. The gas barrier coating material according to any one of B1. to B3.,
in which (number of moles of amino groups included in the polyamine compound in the gas barrier coating material)/(number of moles of —COO— groups included in the polycarboxylic acid in the gas barrier coating material) is equal to or more than 20/100 and equal to or less than 90/100.

B5. The gas barrier coating material according to any one of B1. to B4.,
in which the polycarboxylic acid includes one type or two or more types of polymers selected from the group consisting of polyacrylic acid, polymethacrylic acid, and a copolymer of acrylic acid and methacrylic acid.

B6. The gas barrier coating material according to any one of B1. to B5.,
in which the polyvalent metal compound includes a divalent or higher valency metal compound.

B7. The gas barrier coating material according to any one of B1. to B6.,
in which the polyvalent metal compound includes one type or two or more types of divalent metal compounds selected from magnesium oxide, calcium oxide, barium oxide, zinc oxide, magnesium hydroxide, calcium hydroxide, barium hydroxide, and zinc hydroxide.

B8. The gas barrier coating material according to any one of B1. to B7.,
in which the polyamine compound includes polyethyleneimine.

B9. The gas barrier coating material according to any one of B1. to B8.,
in which the carbonic acid-based ammonium salt includes ammonium carbonate.

B10. A gas barrier film formed of a cured product of the gas barrier coating material according to any one of B1. to B9.

B11. The gas barrier film according to B10.,
in which in an infrared absorption spectrum of the gas barrier film,
when a total peak area in a range of an absorption band of equal to or more than 1493 $cm^{-1}$ and equal to or less than 1780 $cm^{-1}$ is set as A, and
a total peak area in a range of an absorption band of equal to or more than 1598 $cm^{-1}$ and equal to or less than 1690 $cm^{-1}$ is set as B,
an area ratio of an amide bond represented by B/A is equal to or less than 0.380.

B12. The gas barrier film according to B10. or B11.,
in which in an infrared absorption spectrum of the gas barrier film,
a total peak area in a range of an absorption band of equal to or more than 1690 $cm^{-1}$ and equal to or less than 1780 $cm^{-1}$ is set as C,
an area ratio of carboxylic acid represented by C/A is equal to or less than 0.150.

B13. The gas barrier film according to any one of B10. to B12.,
in which in an infrared absorption spectrum of the gas barrier film,
a total peak area in a range of an absorption band of equal to or more than 1493 $cm^{-1}$ and equal to or less than 1598 $cm^{-1}$ is set as D,
an area ratio of carboxylate represented by D/A is equal to or more than 0.520.

B14. A gas barrier laminate including:
a base material layer; and
a gas barrier layer that is provided on at least one surface of the base material layer and is formed of the gas barrier film according to any one of B10. to B13.

B15. The gas barrier laminate according to B14.,
in which the base material layer includes one type or two or more types of resins selected from the group consisting of polyamide, polyethylene terephthalate, and polybutylene terephthalate.

B16. The gas barrier laminate according to B14. or B15.,
in which the base material layer includes a first base material layer, and a second base material layer,
the gas barrier layer, the first base material layer, and the second base material layer are laminated in this order, and
the first base material layer includes one type or two or more types of resins selected from the group consisting of polyamide, polyethylene terephthalate, and polybutylene terephthalate.

B17. The gas barrier laminate according to any one of B14. to B16.,
in which a thickness of the gas barrier layer is equal to or more than 0.01 μm and equal to or less than 15 μm.

B18. The gas barrier laminate according to any one of B14. to B17.,
an inorganic material layer provided between the base material layer and the gas barrier layer.

B19. The gas barrier laminate according to B18.,
in which the inorganic material layer is formed of one type or two or more types of inorganic materials selected from the group consisting of silicon oxide, aluminum oxide, and aluminum.

B20. The gas barrier laminate according to B18. or B19.,
in which the inorganic material layer includes an aluminum oxide layer formed of aluminum oxide.

B21. A method for producing the gas barrier laminate according to any one of B17. to B20.,
a step of applying the gas barrier coating material according to any one of B1. to B9. to a base material layer and then drying the gas barrier coating material to obtain a coating layer; and
a step of heating the coating layer and allowing a carboxyl group included in the polycarboxylic acid and an amino group included in the polyamine compound to undergo a dehydration-condensation reaction to form a gas barrier layer having an amide bond.

C1. A gas barrier film formed of a cured product of a mixture including a polycarboxylic acid, a polyamine compound, and a polyvalent metal compound.
in which (number of moles of polyvalent metal derived from the polyvalent metal compound in the cured product)/(number of moles of —COO— groups derived from the polycarboxylic acid in the cured product) is equal to or more than 0.16.

C2. The gas barrier film according to C1.,
in which (number of moles of amino groups derived from the polyamine compound in the cured product)/(number of moles of —COO— groups derived from the polycarboxylic acid in the cured product) is equal to or more than 20/100 and equal to or less than 90/100.

C3. The gas barrier film according to C1. or C2.,
in which the polycarboxylic acid includes one type or two or more types of polymers selected from the group consisting of polyacrylic acid, polymethacrylic acid, and a copolymer of acrylic acid and methacrylic acid.

C4. The gas barrier film according to any one of C1. to C3.,
in which the polyvalent metal compound includes a divalent or higher valency metal compound.

C5. The gas barrier film according to any one of C1. to C4.,
in which the polyvalent metal compound includes one type or two or more types of divalent metal compounds selected from magnesium oxide, calcium oxide, barium oxide, zinc oxide, magnesium hydroxide, calcium hydroxide, barium hydroxide, and zinc hydroxide.

C6. The gas barrier film according to any one of C1. to C5.,
in which the polyamine compound includes polyethyleneimine.

C7. The gas barrier film according to any one of C1. to C6.,
in which in an infrared absorption spectrum of the gas barrier film,
when a total peak area in a range of an absorption band of equal to or more than 1493 $cm^{-1}$ and equal to or less than 1780 $cm^{-1}$ is set as A, and
a total peak area in a range of an absorption band of equal to or more than 1598 $cm^{-1}$ and equal to or less than 1690 $cm^{-1}$ is set as B,
an area ratio of an amide bond represented by B/A is equal to or less than 0.380.

C8. The gas barrier film according to any one of C1. to C7.,
in which in an infrared absorption spectrum of the gas barrier film,
a total peak area in a range of an absorption band of equal to or more than 1690 cm$^{-1}$ and equal to or less than 1780 cm$^{-1}$ is set as C,
an area ratio of carboxylic acid represented by C/A is equal to or less than 0.150.

C9. The gas barrier film according to any one of C1. to C8.,
in which in an infrared absorption spectrum of the gas barrier film,
a total peak area in a range of an absorption band of equal to or more than 1493 cm$^{-1}$ and equal to or less than 1598 cm$^{-1}$ is set as D,
an area ratio of carboxylate represented by D/A is equal to or more than 0.520.

C10. A gas barrier laminate including:
a base material layer; and
a gas barrier layer that is provided on at least one surface of the base material layer and is formed of the gas barrier film according to any one of C1. to C9.

C11. The gas barrier laminate according to C10.,
in which the base material layer includes one type or two or more types of resins selected from the group consisting of polyamide, polyethylene terephthalate, and polybutylene terephthalate.

C12. The gas barrier laminate according to C10. or C11.,
in which the base material layer includes a first base material layer, and a second base material layer,
the gas barrier layer, the first base material layer, and the second base material layer are laminated in this order, and
the first base material layer includes one type or two or more types of resins selected from the group consisting of polyamide, polyethylene terephthalate, and polybutylene terephthalate.

C13. The gas barrier laminate according to any one of C10. to C12.,
in which a thickness of the gas barrier layer is equal to or more than 0.01 µm and equal to or less than 15 µm.

C14. The gas barrier laminate according to any one of C10. to C13.,
an inorganic material layer provided between the base material layer and the gas barrier layer.

C15. The gas barrier laminate according to C14., in which the inorganic material layer is formed of one type or two or more types of inorganic materials selected from the group consisting of silicon oxide, aluminum oxide, and aluminum.

C16. The gas barrier laminate according to C14. or C15.,
in which the inorganic material layer includes an aluminum oxide layer formed of aluminum oxide.

This application claims priority based on Japanese Patent Application No. 2019-238465, Japanese Patent Application No. 2019-238508, and Japanese Patent Application No. 2019-238626 filed on Dec. 27, 2019, the entire contents of which are incorporated herein by reference.

REFERENCE SIGNS LIST

10: Gas barrier film
100: Gas barrier laminate
101: Base material layer
102: Inorganic material layer
103: Gas barrier layer

The invention claimed is:

1. A gas barrier film formed of a cured product of a mixture including a polycarboxylic acid, a polyamine compound, and a polyvalent metal compound,
wherein in an infrared absorption spectrum of the gas barrier film,
when a total peak area in a range of an absorption band of equal to or more than 1493 cm$^{-1}$ and equal to or less than 1780 cm$^{-1}$ is set as A,
a total peak area in a range of an absorption band of equal to or more than 1598 cm$^{-1}$ and equal to or less than 1690 cm$^{-1}$ is set as B,
a total peak area in a range of an absorption band of equal to or more than 1690 cm$^{-1}$ and equal to or less than 1780 cm$^{-1}$ is set as C, and
a total peak area in a range of an absorption band of equal to or more than 1493 cm$^{-1}$ and equal to or less than 1598 cm$^{-1}$ is set as D,
an area ratio of an amide bond represented by B/A is equal to or less than 0.380,
an area ratio of a carboxylic acid represented by C/A is equal to or less than 0.150, and
an area ratio of carboxylate represented by D/A is equal to or more than 0.635.

2. The gas barrier film according to claim 1,
wherein (number of moles of polyvalent metal derived from the polyvalent metal compound in the cured product)/(number of moles of —COO— groups derived from the polycarboxylic acid in the cured product) is equal to or more than 0.16.

3. The gas barrier film according to claim 1,
wherein (number of moles of amino groups derived from the polyamine compound in the cured product)/(number of moles of —COO— groups derived from the polycarboxylic acid in the cured product) is equal to or more than 20/100 and equal to or less than 90/100.

4. A gas barrier laminate comprising:
a base material layer; and
a gas barrier layer that is provided on at least one surface of the base material layer and is formed of the gas barrier film according to claim 1.

5. The gas barrier laminate according to claim 4,
wherein the base material layer includes a first base material layer, and a second base material layer,
the gas barrier layer, the first base material layer, and the second base material layer are laminated in this order, and
the first base material layer includes one type or two or more types of resins selected from the group consisting of polyamide, polyethylene terephthalate, and polybutylene terephthalate.

6. The gas barrier laminate according to claim 4, further comprising:
an inorganic material layer provided between the base material layer and the gas barrier layer.

7. A method for producing the gas barrier laminate according to claim 4, the method comprising:
a step of applying a gas barrier coating material including the polycarboxylic acid, the polyamine compound and the polyvalent metal compound to the base material layer and then drying the gas barrier coating material to obtain a coating layer; and
a step of heating the coating layer and allowing a carboxyl group included in the polycarboxylic acid and an amino group included in the polyamine compound to undergo a dehydration-condensation reaction to form the gas barrier layer having an amide bond.

8. A gas barrier film formed of a cured product of a gas barrier coating material including a partially neutralized product or a completely neutralized product of a polycarboxylic acid and a volatile base, a polyamine compound, a polyvalent metal compound, and a carbonic acid-based ammonium salt, wherein (number of moles of carbonic acid-based ammonium salt in the gas barrier coating material)/(number of moles of polyvalent metal compound in the gas barrier coating material) is equal to or less than 1.5, and wherein in an infrared absorption spectrum of the gas barrier film, when a total peak area in a range of an absorption band of equal to or more than 1493 $cm^{-1}$ and equal to or less than 1780 $cm^{-1}$ is set as A, and when a total peak area in a range of an absorption band of equal to or more than 1493 $cm^{-1}$ and equal to or less than 1598 $cm^{-1}$ is set as D, an area ratio of carboxylate represented by D/A is equal to or more than 0.635.

9. The gas barrier film according to claim 8, wherein (number of moles of the polyvalent metal compound in the gas barrier coating material)/(number of moles of —COO— groups included in the polycarboxylic acid in the gas barrier coating material) of the gas barrier coating material is equal to or more than 0.16.

10. The gas barrier film according to claim 8, wherein (number of moles of amino groups included in the polyamine compound in the gas barrier coating material)/(number of moles of —COO— groups included in the polycarboxylic acid in the gas barrier coating material) of the gas barrier coating material is equal to or more than 20/100 and equal to or less than 90/100.

11. The gas barrier film according to claim 8, wherein in an infrared absorption spectrum of the gas barrier film, when a total peak area in a range of an absorption band of equal to or more than 1493 $cm^{-1}$ and equal to or less than 1780 $cm^{-1}$ is set as A, and a total peak area in a range of an absorption band of equal to or more than 1598 $cm^{-1}$ and equal to or less than 1690 $cm^{-1}$ is set as B, an area ratio of an amide bond represented by B/A is equal to or less than 0.380.

12. The gas barrier film according to claim 8, wherein in an infrared absorption spectrum of the gas barrier film, when a total peak area in a range of an absorption band of equal to or more than 1493 $cm^{-1}$ and equal to or less than 1780 $cm^{-1}$ is set as A, and when a total peak area in a range of an absorption band of equal to or more than 1690 $cm^{-1}$ and equal to or less than 1780 $cm^{-1}$ is set as C, an area ratio of a carboxylic acid represented by C/A is equal to or less than 0.150.

13. A gas barrier film formed of a cured product of a mixture including a polycarboxylic acid, a polyamine compound, and a polyvalent metal compound, wherein (number of moles of polyvalent metal derived from the polyvalent metal compound in the cured product)/(number of moles of —COO— groups derived from the polycarboxylic acid in the cured product) is equal to or more than 0.16, wherein in an infrared absorption spectrum of the gas barrier film, when a total peak area in a range of an absorption band of equal to or more than 1493 $cm^{-1}$ and equal to or less than 1780 $cm^{-1}$ is set as A, and when a total peak area in a range of an absorption band of equal to or more than 1493 $cm^{-1}$ and equal to or less than 1598 $cm^{-1}$ is set as D, an area ratio of carboxylate represented by D/A is equal to or more than 0.635.

14. The gas barrier film according to claim 13, wherein (number of moles of amino groups derived from the polyamine compound in the cured product)/(number of moles of —COO— groups derived from the polycarboxylic acid in the cured product) is equal to or more than 20/100 and equal to or less than 90/100.

15. The gas barrier film according to claim 13, wherein in an infrared absorption spectrum of the gas barrier film, when a total peak area in a range of an absorption band of equal to or more than 1493 $cm^{-1}$ and equal to or less than 1780 $cm^{-1}$ is set as A, and a total peak area in a range of an absorption band of equal to or more than 1598 $cm^{-1}$ and equal to or less than 1690 $cm^{-1}$ is set as B, an area ratio of an amide bond represented by B/A is equal to or less than 0.380.

16. The gas barrier film according to claim 13, wherein in an infrared absorption spectrum of the gas barrier film, when a total peak area in a range of an absorption band of equal to or more than 1493 $cm^{-1}$ and equal to or less than 1780 $cm^{-1}$ is set as A, and when a total peak area in a range of an absorption band of equal to or more than 1690 $cm^{-1}$ and equal to or less than 1780 $cm^{-1}$ is set as C, an area ratio of a carboxylic acid represented by C/A is equal to or less than 0.150.

* * * * *